(12) United States Patent
Mook et al.

(10) Patent No.: US 11,193,385 B2
(45) Date of Patent: Dec. 7, 2021

(54) GAS BEARING SEAL

(71) Applicant: General Electric Company, Schenectady, NY (US)

(72) Inventors: Joshua Tyler Mook, Loveland, OH (US); Bugra Han Ertas, Niskayuna, NY (US); Jason Joseph Bellardi, Cincinnati, OH (US); Nathan Evan McCurdy Gibson, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 852 days.

(21) Appl. No.: 15/131,154

(22) Filed: Apr. 18, 2016

(65) Prior Publication Data

US 2017/0298752 A1 Oct. 19, 2017

(51) Int. Cl.
*F01D 11/04* (2006.01)
*F01D 25/16* (2006.01)
(Continued)

(52) U.S. Cl.
CPC ............ *F01D 11/04* (2013.01); *F01D 11/003* (2013.01); *F01D 25/16* (2013.01); *F01D 25/22* (2013.01);
(Continued)

(58) Field of Classification Search
CPC ........ F01D 11/04; F01D 11/003; F01D 25/16; F16C 32/0622; F16C 32/0607;
(Continued)

(56) References Cited

U.S. PATENT DOCUMENTS 2,926,050 A * 2/1960 Battle .................. F01D 25/166
384/121
2,972,504 A 2/1961 Baker
(Continued)

FOREIGN PATENT DOCUMENTS

CH 550340 A 6/1974
EP 0642130 A2 3/1995
(Continued)

OTHER PUBLICATIONS

Dellacorte et al., "Load Capacity Estimation of Foil Air Journal Bearings for Oil-Free Turbomachinery Applications", Tribology Transactions, Taylor & Francis Online, vol. No. 43, Issue No. 4, pp. 795-801, 2000.
(Continued)

*Primary Examiner* — Richard A Edgar
*Assistant Examiner* — Aye S Htay
(74) *Attorney, Agent, or Firm* — Venable LLP; Michele V. Frank

(57) ABSTRACT

A turbomachine includes a compressor section, a turbine section, and a rotary component. The rotary component is attached to and rotatable with a portion of at least one of the compressor section and the turbine section. The turbomachine additionally includes a seal having a gas bearing. The gas bearing defines an inner surface along a radial direction of the turbomachine, a high pressure end, and a low pressure end. The gas bearing supports the rotary component and also prevents an airflow from the high pressure end to the low pressure end between the rotary component and the inner surface of the gas bearing.

18 Claims, 15 Drawing Sheets

(51) Int. Cl.
  *F01D 11/00* (2006.01)
  *F16C 32/06* (2006.01)
  *F16J 15/40* (2006.01)
  *F16J 15/447* (2006.01)
  *F01D 25/22* (2006.01)

(52) U.S. Cl.
  CPC ........... *F16C 32/0622* (2013.01); *F16J 15/40* (2013.01); *F16J 15/447* (2013.01); *F05D 2220/32* (2013.01); *F05D 2240/53* (2013.01); *F05D 2240/55* (2013.01); *F05D 2260/98* (2013.01); *F16C 32/0607* (2013.01); *F16C 2360/23* (2013.01)

(58) Field of Classification Search
  CPC ...... F16J 15/40; F16J 15/447; F05D 2220/32; F05D 2240/53; F05D 2240/55
  See application file for complete search history.

(56) References Cited

U.S. PATENT DOCUMENTS

| | | | |
|---|---|---|---|
| 3,004,804 | A | 10/1961 | Pinkus et al. |
| 3,110,526 | A | 11/1963 | Sternlicht |
| 3,351,394 | A * | 11/1967 | Hooker ............. F16C 17/03 384/108 |
| 3,395,949 | A * | 8/1968 | Kun ............. F01D 25/22 384/119 |
| 3,568,438 | A * | 3/1971 | Meienberg ........... F01D 15/08 184/6 |
| 3,620,581 | A * | 11/1971 | Heller ............. F16C 32/0618 384/100 |
| 3,721,479 | A | 3/1973 | Rasnick et al. |
| 3,779,486 | A * | 12/1973 | Lewis ............. B64C 29/0066 244/53 R |
| 3,863,996 | A | 2/1975 | Raimondi |
| 3,891,281 | A | 6/1975 | Jenness |
| 3,898,793 | A | 8/1975 | Nakamura et al. |
| 3,944,304 | A | 3/1976 | Purtschert |
| 3,994,541 | A | 11/1976 | Geary et al. |
| 4,226,483 | A | 10/1980 | Yamamoto |
| 4,262,975 | A | 4/1981 | Heshmat et al. |
| 4,410,220 | A | 10/1983 | Robinson |
| 4,632,574 | A | 12/1986 | Wilson et al. |
| 4,743,125 | A | 5/1988 | Dammel et al. |
| 4,793,722 | A | 12/1988 | Jensen |
| 4,872,767 | A | 10/1989 | Knapp |
| 4,921,229 | A | 5/1990 | Hori |
| 4,971,458 | A | 11/1990 | Carlson |
| 5,044,781 | A | 9/1991 | Werner |
| 5,085,521 | A | 2/1992 | Singh |
| 5,149,206 | A | 9/1992 | Bobo |
| 5,222,815 | A | 6/1993 | Ide |
| 5,328,408 | A | 7/1994 | Wolf et al. |
| 5,360,273 | A | 11/1994 | Buckmann |
| 5,374,129 | A | 12/1994 | Vohr et al. |
| 5,380,100 | A | 1/1995 | Yu |
| 5,421,655 | A | 6/1995 | Ide |
| 5,501,531 | A | 3/1996 | Hamaekers |
| 5,603,574 | A | 2/1997 | Ide |
| 5,743,654 | A | 4/1998 | Ide |
| 6,019,515 | A | 2/2000 | Fujii et al. |
| 6,169,332 | B1 | 1/2001 | Taylor et al. |
| 6,308,810 | B1 | 10/2001 | Kuwayama |
| 6,536,565 | B2 | 3/2003 | Oliver et al. |
| 6,679,045 | B2 | 1/2004 | Karafillis et al. |
| 6,700,747 | B2 | 3/2004 | Matz |
| 6,883,967 | B2 | 4/2005 | Robb et al. |
| 7,290,931 | B2 | 11/2007 | Wardman et al. |
| 7,394,076 | B2 | 7/2008 | Devitt |
| 7,431,504 | B1 | 10/2008 | Pelfrey |
| 7,517,152 | B1 | 4/2009 | Walsh |
| 7,607,647 | B2 | 10/2009 | Zhao et al. |
| 7,625,121 | B2 | 12/2009 | Pettinato et al. |
| 7,628,542 | B2 | 12/2009 | Wada et al. |
| 7,896,550 | B1 | 3/2011 | Pinera et al. |
| 7,987,599 | B2 | 8/2011 | Mavrosakis |
| 8,083,413 | B2 | 12/2011 | Ertas |
| 8,118,570 | B2 | 2/2012 | Meacham et al. |
| 8,146,369 | B2 | 4/2012 | Walitzki et al. |
| 8,206,039 | B2 | 6/2012 | Maier |
| 8,209,834 | B2 | 7/2012 | Mons et al. |
| 8,240,919 | B2 | 8/2012 | Hirata |
| 8,256,750 | B2 | 9/2012 | Cottrell et al. |
| 8,272,786 | B2 | 9/2012 | Cottrell |
| 8,342,796 | B2 | 1/2013 | Spencer et al. |
| 8,366,382 | B1 * | 2/2013 | Muldoon ............. F01D 11/02 415/111 |
| 8,591,117 | B2 | 11/2013 | Giraud et al. |
| 8,702,311 | B2 | 4/2014 | Matsuo et al. |
| 8,720,205 | B2 | 5/2014 | Lugg |
| 8,796,893 | B2 | 8/2014 | Muth |
| 8,814,437 | B2 | 8/2014 | Braun |
| 8,834,027 | B2 | 9/2014 | Zeidan |
| 8,998,492 | B2 | 4/2015 | Bertea |
| 9,046,001 | B2 | 6/2015 | Hindle et al. |
| 9,121,448 | B2 | 9/2015 | Delgado Marquez et al. |
| 9,169,846 | B2 | 10/2015 | Mariotti |
| 9,297,438 | B2 | 3/2016 | Meacham et al. |
| 2005/0008269 | A1 | 1/2005 | Akutsu et al. |
| 2006/0054660 | A1 | 3/2006 | Chappell |
| 2013/0186105 | A1 * | 7/2013 | Meacham ............. F01D 25/28 60/797 |
| 2013/0216174 | A1 | 8/2013 | Braun |
| 2014/0140645 | A1 | 5/2014 | Meacham et al. |
| 2014/0154058 | A1 | 6/2014 | Meacham et al. |
| 2014/0286599 | A1 | 9/2014 | Devitt et al. |
| 2015/0104123 | A1 | 4/2015 | Ertas et al. |
| 2015/0275967 | A1 | 10/2015 | Ryu |

FOREIGN PATENT DOCUMENTS

| | | |
|---|---|---|
| EP | 2853759 A1 | 4/2015 |
| JP | H09280383 A | 10/1997 |
| JP | 2001050267 A | 2/2001 |
| JP | 2006263824 A | 10/2006 |
| JP | 2009030704 A | 2/2009 |
| JP | 2012092969 A | 5/2012 |

OTHER PUBLICATIONS

Andres, "Hybrid Flexure Pivot-Tilting Pad Gas Bearings: Analysis and Experimental Validation", Journal of Tribology, ASME, vol. No. 128, Issue No. 3, 551-558, Mar. 1, 2006.

Gu et al., "Laser additive manufacturing of metallic components: materials, processes and mechanisms", International Materials Reviews, Maney Online, vol. No. 57, Issue No. 3, pp. 133-164, May 2012.

U.S. Notice of Allowance issued in connection with related U.S. Appl. No. 14/566,798 dated Apr. 26, 2016.

GE Related Case Form.

U.S. Non-Final Rejection issued in connection with related U.S. Appl. No. 15/131,136 dated May 8, 2017.

European Search Report and Opinion Issued in connection with related EP Application No. 17165709.1 dated May 31, 2017.

U.S. Non-Final Office Action Issued in connection with related U.S. Appl. No. 15/131,081 dated Jun. 13, 2017.

Gunter et al., "Design of Nonlinear Squeeze-Film Dampers for Aircraft Engines", Journal of Lubrication Technology, vol. No. 99, Issue No. 01, pp. 57-64, Mar. 10, 1976.

Heshmat et al., "Analysis of Gas-Lubricated Foil Journal Bearings", Journal of Lubrication Technology, vol. No. 105, Issue No. 4, pp. 647-655, Oct. 1, 1983.

Agrawal, "Foil Air/Gas Bearing Technology—An Overview", Microturbines and Small Turbomachinery, ASME International Gas Turbine and Aeroengine Congress and Exhibition, Orlando, Florida, USA, Paper No. 97-GT-347, 11 pages, Jun. 2-5, 1997.

U.S. Non-Final Office Action issued in connection with related U.S. Appl. No. 15/131,113 dated Nov. 17, 2016.

* cited by examiner

GAS BEARING SEAL

FIELD OF THE INVENTION

The present subject matter relates generally to a gas bearing, or more particularly to a gas bearing incorporated into a seal for use in a turbomachine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, compressor impellers, turbines, couplings, sealing packs, and other elements required for optimal operation under given operating conditions. These rotor assemblies have a mass generating a constant static force due to gravity, and also generate a dynamic force due, e.g., to imbalances in the rotor assembly during operation. Such gas turbine engines include bearings to sustain and support these forces while permitting rotation of the rotor assembly.

For at least some gas turbine engines, these bearings are located where a high pressure region must be sealed off from an adjacent low pressure region. Typically, a plurality layers of mechanical seals are provided to effect the desired seal, and also to collect/isolate an amount of oil lubrication typically required for the bearings. However, such a configuration may lead to overly complicated gas turbine engines. Accordingly, a component capable of simplifying the sealing functions and bearing functions within a gas turbine engine would be useful. Specifically, a component capable of performing sealing functions as well as bearing/lubrication functions would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a turbomachine is provided. The turbomachine defines an axial direction and a radial direction. The turbomachine includes a compressor section, a turbine section, and a rotary component attached to and rotatable with a portion of at least one of the compressor section and the turbine section. The turbomachine also includes a seal including a gas bearing, the gas bearing defining an inner surface along the radial direction, a high pressure end, and a low pressure end. The gas bearing supports the rotary component and prevents an airflow from the high pressure end to the low pressure end between the rotary component and the inner surface of the gas bearing.

In another exemplary embodiment of the present disclosure, a seal for a turbomachine defining an axial direction and a radial direction is provided. The turbomachine includes a compressor section, a turbine section, and a rotary component attached to and rotatable with a portion of at least one of the compressor section and the turbine section. The seal includes a gas bearing defining an inner surface along the radial direction, a high pressure end, and a low pressure end. The gas bearing supports the rotary component and prevents an airflow from the high pressure end of the bearing to the low pressure end of the bearing between the rotary component and the inner surface of the gas bearing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
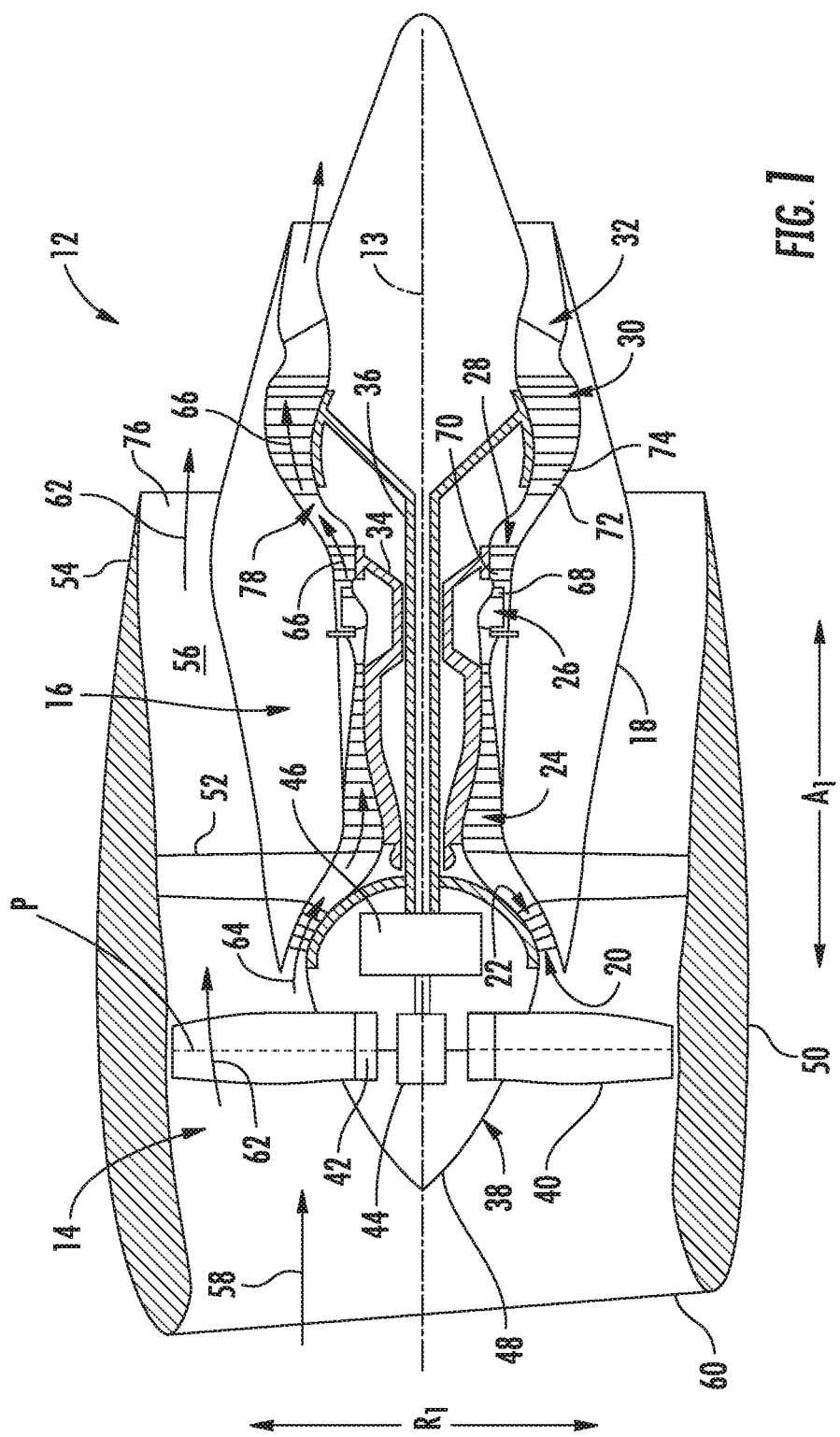
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure relates generally to a seal including a gas bearing for use in a turbomachine. One particularity, however, of gas bearings is a lower load capability as compared to conventional oil-requiring rolling element bearings in aircraft engines and other turbomachines. Accordingly, the inventors of the present disclosure have discovered that in order to sustain the same load as rolling element bearings, a turbomachine utilizing gas bearings needs to utilize more gas bearings to support the same shaft, so that an individual load per bearing is within an allowable load capacity of the gas bearings included therein.

One possibility to increase a number of gas bearings is to increase an axial length of the shaft being supported. However, the inventors of the present disclosure have discovered that it may be beneficial to increase a number of gas bearings supporting a particular shaft without increasing an axial length of the shaft.

Notably, conventional aircraft engines isolate the bearing assemblies from turbomachinery stages like compressors and turbines. This is due at least in part to the requirement that conventional bearing systems utilize oil to operate (e.g., for lubrication). The conventional bearings therefore need to be sealed from other regions of the engine. However, when implementing a gas bearing in accordance with one or more of the embodiments described herein, the lubricating fluid in the bearing is the same as the working fluid of the turbomachine. The inventors of the present disclosure have discovered that such may therefore allow for innovative turbomachine architectures.

Specifically, the inventors of the present disclosure have discovered that in certain embodiments, the gas bearings may be integrated into inter-stage locations of the turbomachinery stages, functioning as a gas bearing supporting the components and as a seal sealing such locations. Accordingly, this integration may allow for utilization of seals including gas bearings without influencing an axial length of the shafts being supported and the turbomachine as a whole.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A1 (extending parallel to a longitudinal centerline 13 provided for reference), a radial direction R1, and a circumferential direction (not shown) extending about the axial direction A1. In general, the turbofan 12 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A1 during operation of the turbofan engine 12.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 12 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 12, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 12 depicted in FIG. 1 is provided by way of example only, and that in other exemplary embodiments, the turbofan engine 12 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
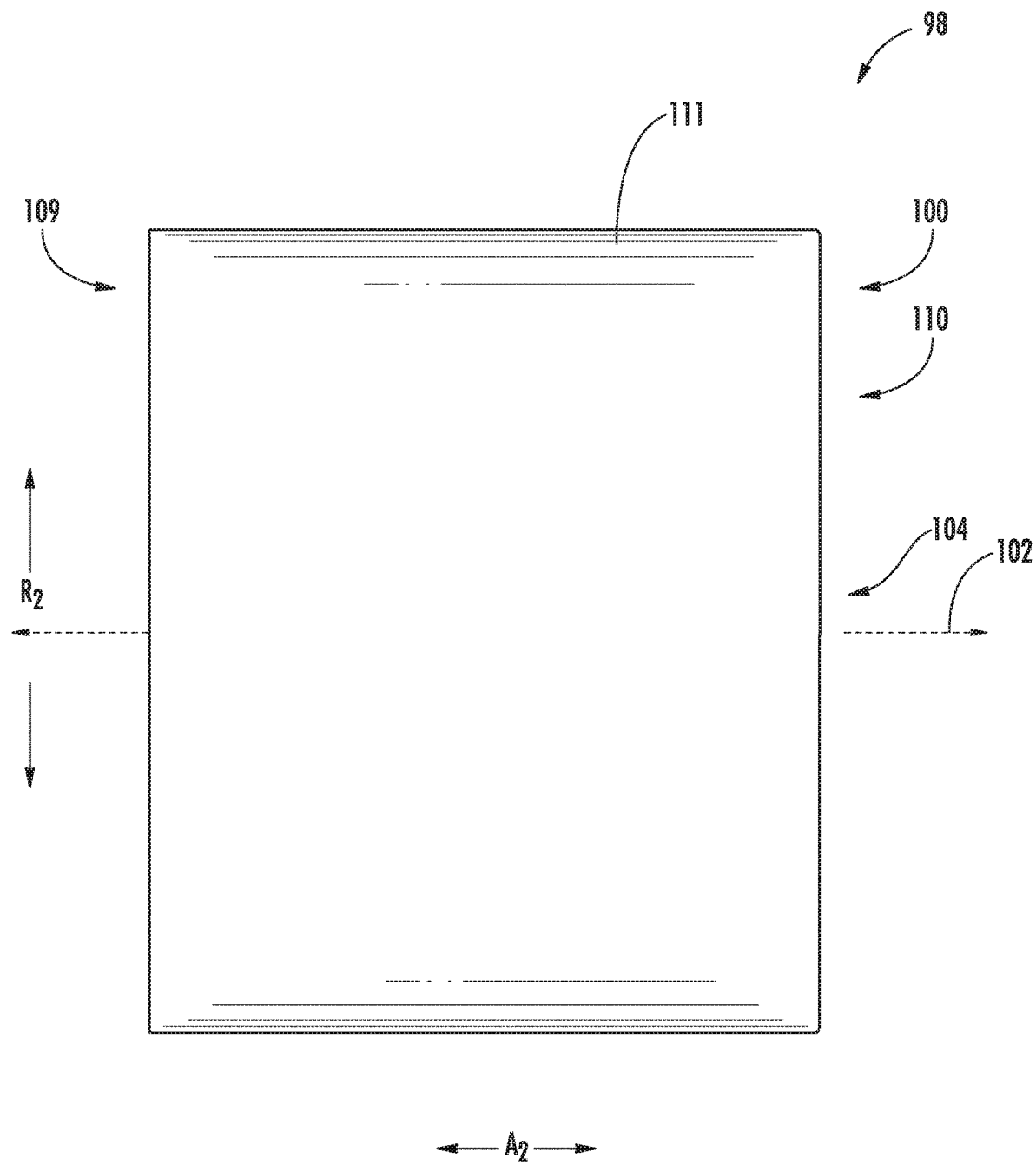
FIG. 2 is a side view of a seal in accordance with an exemplary embodiment of the present disclosure.
Figure 3:
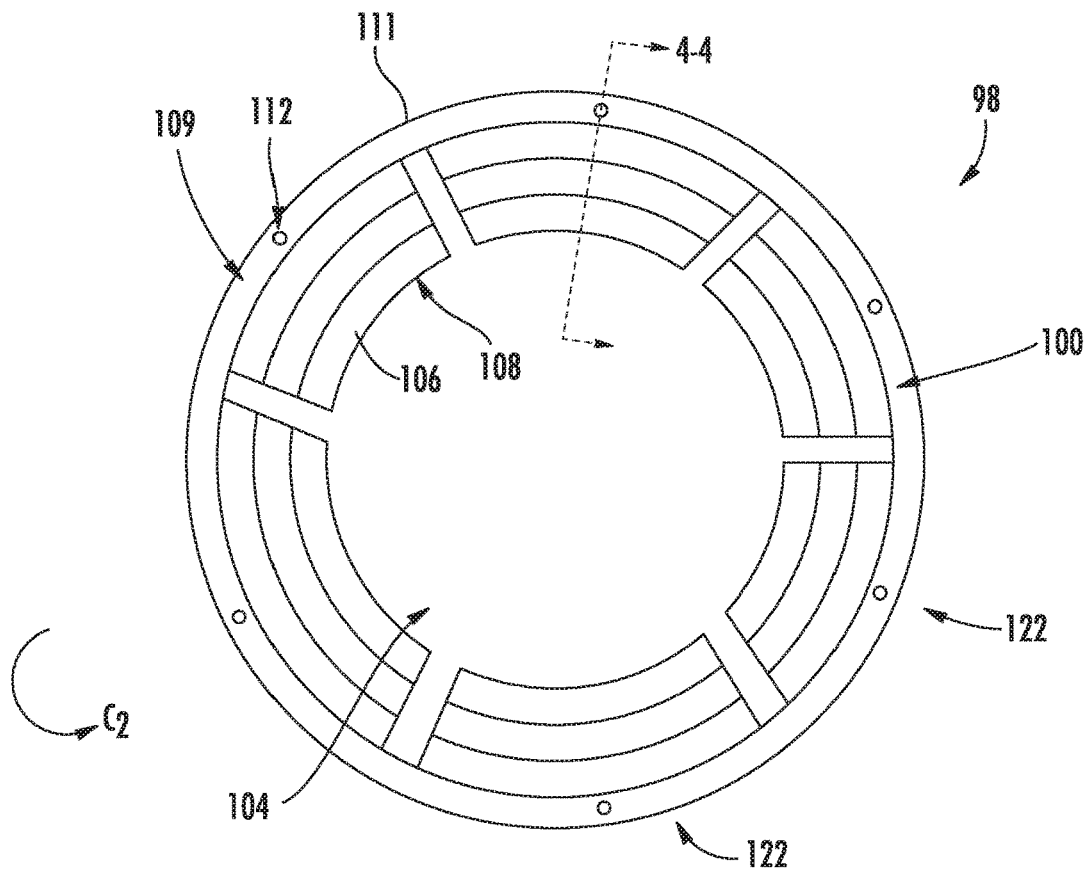
FIG. 3 is an axial view of the exemplary seal of FIG. 2.
Figure 4:
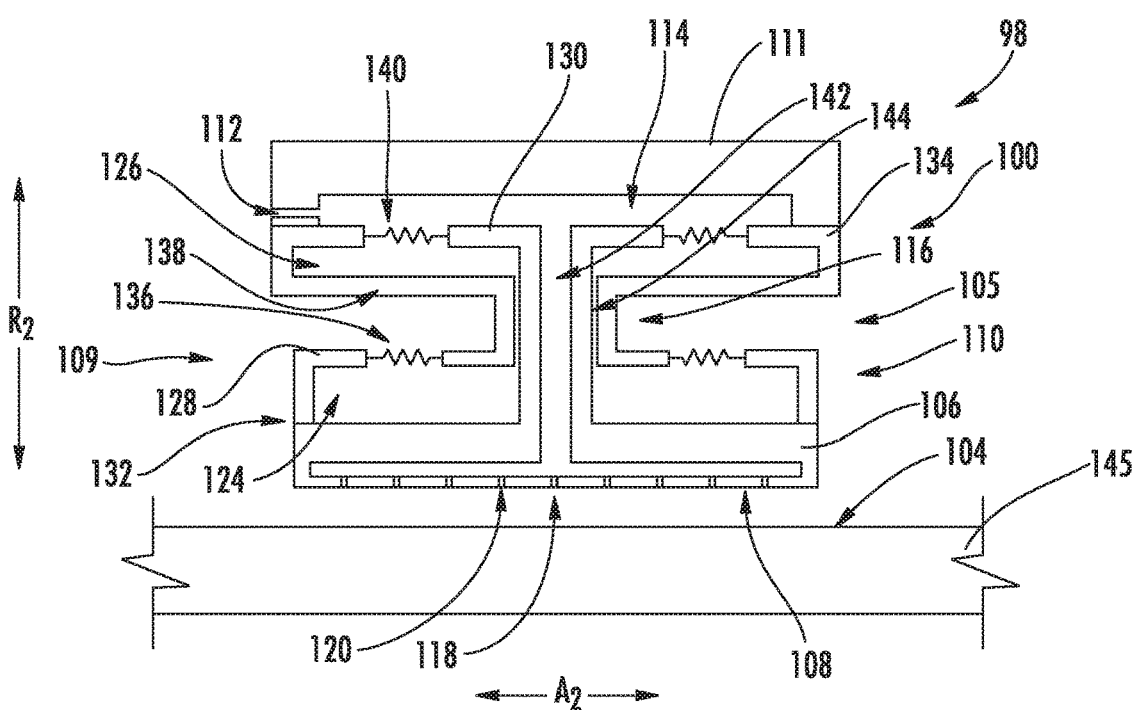
FIG. 4 is a side, schematic, cross-sectional view of the exemplary seal of FIG. 2, taken along Line 4-4 in FIG. 3.

Referring now to FIGS. 2 through 4, a seal 98 in accordance with an exemplary embodiment of the present disclosure is depicted. Specifically, FIG. 2 provides a side view of a seal 98 in accordance with an exemplary embodiment of the present disclosure; FIG. 3 provides an axial view of the exemplary seal 98 of FIG. 2; and FIG. 4 provides a schematic, cross-sectional view of the exemplary seal 98 of FIG. 2, taken along Line 4-4 in FIG. 3. In certain exemplary embodiments, the exemplary seal 98 may be incorporated into the exemplary turbofan engine 12 described above with reference to FIG. 1.

As shown, the exemplary seal 98 generally includes a bearing 100, the exemplary bearing 100 depicted generally defining an axial direction A2 (and a central axis 102 extending generally along the axial direction A2), a radial direction R2, and a circumferential direction C2 (FIG. 3). The bearing 100 defines an axial opening 104 and is configured to support a rotary component 145 (see FIG. 4), e.g., of the turbine engine 12, within the axial opening 104. The bearing 100 generally includes one or more bearing pads 106, each defining an inner surface 108 for supporting the rotary component 145 and one or more damper assemblies 105 attached to or formed integrally with the bearing pad 106. Additionally, the exemplary seal 98 includes an outer wall 111 surrounding the bearing 100, the outer wall attached to or formed integrally with a damper assembly 105 of the bearing 100.

The bearing 100 is configured as a "gas" bearing, or oil-free/oil-less bearing, and accordingly the bearing 100 is generally configured to provide the inner surfaces 108 of the one or more bearing pads 106 with a flow of a working gas (e.g., air, compressed air and combustion gases, or the like) during operation to create separation with the rotary component 145 and provide a low friction means for supporting such rotary component 145 (not depicted).

The seal 98 generally includes a first end along the axial direction A2 and a second, opposite end along the axial direction A2. Further, as will be discussed in greater detail below, the exemplary bearing 100 depicted defines a high pressure end 109 proximate the first end of the seal 98 and a low pressure end 110 proximate the second end of the seal 98. As is also depicted, the seal 98 includes a gas inlet 112 at the first end along the axial direction A2 and a supply channel 114 (FIG. 4) extending from the gas inlet 112 to a column 116. The column 116 is configured to provide the bearing pad 106 with a flow of the working gas from the supply channel 114, as will be discussed in greater detail below.

Additionally, for the exemplary embodiment depicted, the column 116 is configured as a support member substantially fully supporting the bearing pad 106. Specifically, as is depicted, the column 116 extends towards the bearing pad 106 and supports the bearing pad 106. Further, for the embodiment depicted, the column 116 is located approximately at a center of the bearing pad 106. More particularly, the bearing pad 106 depicted defines a center 118 along the axial direction A2 and along the circumferential direction C2, and the column 116 is at least partially attached to or formed integrally with the bearing pad 106 proximate the center 118 of the bearing pad 106. However, in other embodiments, the column 116 may instead be positioned off-center from the bearing pad 106 (see, e.g., FIG. 5).

In certain embodiments, the bearing pad 106 may be configured to disperse and/or diffuse the working gas to support and/or lubricate the rotary component 145 during operation of the bearing 100. In such manner, the bearing 100 may provide a hydrostatically pressurized compliant bearing pad 106. For example, the exemplary bearing pad 106 depicted includes a plurality of gas distribution holes 120 disposed across the bearing pad 106 to provide an evenly distributed pressure field within the axial opening 104 for supporting and/or lubricating the rotary component 145.

The exemplary plurality of gas distribution holes 120 depicted are spaced substantially evenly along the axial direction A2. However, as will be discussed below, in other embodiments, the plurality of gas distribution holes 120 may be arranged in other suitable manners. Additionally, in certain embodiments, the plurality of gas distribution holes 120 may generally have a diameter in the range of between about 2 mils (about 50 micrometers) and about 100 mils (about 2,540 micrometers) and, more specifically, between about 5 mils (about 127 micrometers) and about 20 mils (about 508 micrometers). Alternatively, or in addition, in some embodiments, each bearing pad 106 may have a sufficiently high gas permeability to permit the working gas received from the column 116 to generate sufficient pressure within axial opening 104 to provide the support and/or lubrication of the rotary component 145.

Furthermore, as is depicted, the bearing 100 includes a plurality of sections 122 spaced along the circumferential direction C2 of the bearing 100. Each section 122 may generally include a bearing pad 106 (e.g., configured in the same manner described above) and a damper assembly 105. Accordingly, as may be seen most clearly in, e.g., FIG. 3, the bearing 100 includes a plurality of bearing pads 106 substantially evenly spaced along the circumferential direction C2. Each of the bearing pads 106 defines a respective inner surface 108, the inner surfaces 108 of the plurality of bearing pads 106 together defining a substantially annular support surface along the circumferential direction C2 and a linear support surface along the axial direction A2 (see, e.g., FIG. 4) for supporting a rotary component 145.

The bearing pads 106 may be fabricated from any material suitable to withstand the working conditions of the bearing 100. In addition, in some embodiments, the bearing pads 106 may be fabricated form a material having a sufficiently low porosity to prevent instabilities in the thin gas film created between bearing pads 106 and the rotary component 145 during operation of, e.g., the turbomachine. For example, in some embodiments, the bearing pads 106 may be fabricated from porous carbons, such as carbon graphite, sintered porous ceramics, and sintered porous metals, such as cobalt, nickel, or iron-based alloys.

Moreover, in some embodiments, the bearing pad 106 and damper assembly 105 of each section 122 may be formed integrally of a single, continuous material. For example, in some embodiments, each of the bearing pads 106 may be formed integrally with the damper assembly 105 of the respective section 122 of the bearing 100, such that the bearing pad 106 and damper assembly 105 of the respective section 122 are fabricated to form a single integral part. Moreover, in certain embodiments, a plurality of bearing pads 106 and damper assemblies 105 forming two or more sections 122 may be formed integrally, or further still, each of the plurality of bearing pads 106 and respective damper assemblies 105 forming the bearing 100 may be formed integrally.

The bearing pads 106 and damper assembly 105 may be fabricated via any technique suitable to facilitate forming the integral part depicted and described below. For example, in some embodiments, the bearing pads 106 and the damper assembly 105 may be fabricated using an additive manufacturing process (also known as rapid prototyping, rapid manufacturing, and 3D printing), such as selective laser sintering (SLS), direct metal laser sintering (DMLS), electron beam melting (EBM), diffusion bonding, or selective heat sintering (SHS). It should be appreciated, however, that in other embodiments one or more of the bearing 100 sections 122, including a bearing pad 106 and a respective damper assembly 105, may be formed integrally of a single, continuous material and joined to separately formed, adjacent bearing 100 sections 122 in any other suitable manner, such as through a mechanical fastening means.

Referring particularly to FIG. 4, as noted above each of the bearing 100 sections 122 includes a damper assembly 105. More particularly, for the embodiment depicted, the damper assembly 105 at least partially defines a first fluid damper cavity 124 and a second fluid damper cavity 126. The first fluid damper cavity 124 is positioned adjacent to the bearing pad 106 and the second fluid damper cavity 126 is spaced from the first fluid damper cavity 124, or more particularly, is spaced from the first fluid damper cavity 124 along the radial direction R2.

For the embodiment depicted, the damper assembly 105 for each bearing 100 section 122 generally includes a first, outer wall 128 and a second, inner wall 130. The inner wall 130 and outer wall 128, for the embodiment depicted, are configured as a serpentine inner wall 130 and a serpentine outer wall 128 (i.e., a wall extending in a variety of directions), respectively. For example, the bearing pad 106 generally defines an outer periphery 132. The serpentine outer wall 128 is attached to or formed integrally with the bearing pad 106 proximate the outer periphery 132 of the bearing pad 106 (or rather, at the outer periphery 132 of the bearing pad 106), extends generally towards the center 118 of the bearing pad 106 along the axial direction A2, and subsequently extends back away from the center 118 of the bearing pad 106 along the axial direction A2, connecting with a body 134 of a housing 113 of the seal 98. Similarly, for the embodiment depicted, the inner wall 130 is attached to or formed integrally with the bearing pad 106 proximate the center 118 of the bearing pad 106 (or rather, at the center 118 of the bearing pad 106), extends generally away from the bearing pad 106 along the radial direction R2, and subsequently extends away from the center 118 of the bearing pad 106 along the axial direction A2, also connecting with the body 134 of the housing 113.

Further, as is depicted schematically, the outer wall 128 generally includes a semi-rigid portion 136 and a rigid portion 138, and similarly the inner wall 130 includes a semi-rigid portion 140. As is depicted, the outer wall 128 at least partially defines the first fluid damper cavity 124 and at least partially defines the second fluid damper cavity 126. Additionally, the bearing pad 106 at least partially defines the first fluid damper cavity 124, and the inner wall 130 at least partially defines the second fluid damper cavity 126. More particularly, for the embodiment depicted the semi-rigid portion 136 of the outer wall 128 and bearing pad 106 together define the first fluid damper cavity 124, and the rigid portion 138 of the outer wall 128 and semi-rigid portion 140 of the inner wall 130 together define the second fluid damper cavity 126.

It should be appreciated, that as used herein, the terms "semi-rigid" and "rigid" are relative terms. Accordingly, a component of the bearing 100 described as semi-rigid may be configured to bend, flex, or give way prior to a component of the bearing 100 described as rigid. Further, a component of the bearing 100 described as "semi-rigid" herein refers to a component configured to bend, flex, or give way during normal operation of the bearing 100 while incurring little or no damage.

Moreover, for the embodiment depicted the first fluid damper cavity 124 is in flow communication with the second fluid damper cavity 126 through a portion of the column 116. Specifically, the exemplary column 116 depicted is configured as a double-walled column 116 formed from a portion of the inner wall 130 and a portion of the outer wall 128. Accordingly, the column 116 is supported at a radially outer end by the rigid portion 138 of the outer wall 128 and the semi-rigid portion 140 of the inner wall 130. Further, at a radially inner end the portion of the column 116 formed by the inner wall 130 is attached to the bearing pad 106 (or rather formed integrally with the bearing pad 106), and the portion of the column 116 formed by the outer wall 128 is attached to the bearing pad 106 through the semi-rigid portion 136 of the outer wall 128.

Moreover, the inner wall 130 defines an inner channel 142 for providing the bearing pad 106 with the working gas, and the outer wall 128 and inner wall 130 together define an outer channel 144. As will be appreciated, for the embodiment depicted the outer channel 144 is concentric with the inner channel 142 and defines a substantially annular shape around the inner channel 142. Further, for the embodiment depicted, the outer channel 144 is configured as a clearance gap, such that the first fluid damper cavity 124 and the second fluid damper cavity 126 are in restrictive flow communication through the outer channel 144.

Further, the first fluid damper cavity 124, second fluid damper cavity 126, and outer channel 144 are all sealed together, and together define a fixed volume. During operation, the first and second fluid damper cavities 124, 126 and outer channel 144 are each completely filled with the dampening fluid. The dampening fluid may be, e.g., an oil, such as heat transfer oil, or alternatively may be any other suitable fluid, such as any suitable incompressible liquid. The bearing 100 is configured to transfer the damper fluid from the first fluid damper cavity 124, through the outer channel 144/clearance gap, and to the second fluid damper cavity 126 in response to a force acting on the bearing pad 106.

When a force acts on the bearing pad 106, such as when the rotary component 145 supported by the bearing 100 presses on the bearing pad 106 generally along the radial direction R2, the portion of the housing 113 forming the damper assembly 105 allows for the bearing pad 106 to move along the radial direction R2, absorbing such force. More particularly, as the column 116 supporting the bearing pad 106 moves up (or radially outward), the semi-rigid portion 136 of the outer wall 128 partially deforms (decreasing a volume of the first fluid damper cavity 124), a portion of the damping fluid within the first fluid damper cavity 124 is forced through the outer channel 144 of the column 116, configured as a clearance gap, and flows into the second fluid damper cavity 126. At the same time, the rigid portion 138 of the outer wall 128 remains substantially stationary, and the semi-rigid portion 140 of the inner wall 130 partially deforms to increase a volume of the second fluid damper cavity 126 and accept the portion of the dampening fluid provided through the outer channel 144 of the column 116 from the first fluid damper cavity 124. Such movement absorbs the force exerted on the bearing pad 106, and dampens such movement. For example, the relatively tight clearance of the outer channel 144/clearance gap resists relatively quick movement of the bearing pad 106 along the radial direction R2. In the absence of the force exerted on the bearing pad 106, the dampening fluid transferred to the second fluid damper cavity 126 may reverse in flow direction, and flow back through the outer channel 144 of the column 116 to the first fluid damper cavity 124.

Furthermore, once installed in a gas turbine engine, the seal 98 (including the bearing 100) may be utilized to additionally provide a substantially airtight seal between the first end (and high pressure end 109 of the bearing 100) and a second end (and low pressure end 110 of the bearing 100), between the rotary component 145 and the inner surface 108 of the bearing 100. However, as the name implies, an air pressure at the first end of the seal 98 (and high pressure end 109 of the bearing 100) may be greater than the air pressure at the second end of the seal 98 (and low pressure end 110 of the bearing 100). When this pressure differential is greater than a certain threshold, the pressure differential may cause an evenly supported bearing pad 106 (such as the one depicted in FIG. 4) to tilt with respect to the axial direction A2, and potentially rub against the rotary component 145 at the low pressure end 110 of the bearing 100. Accordingly, in certain embodiments, it may be beneficial for seal 98 to include one or more features for counteracting a pressure differential from a high pressure end 109 of the seal 98 to a low pressure end 110 of the seal 98.

Figure 5:
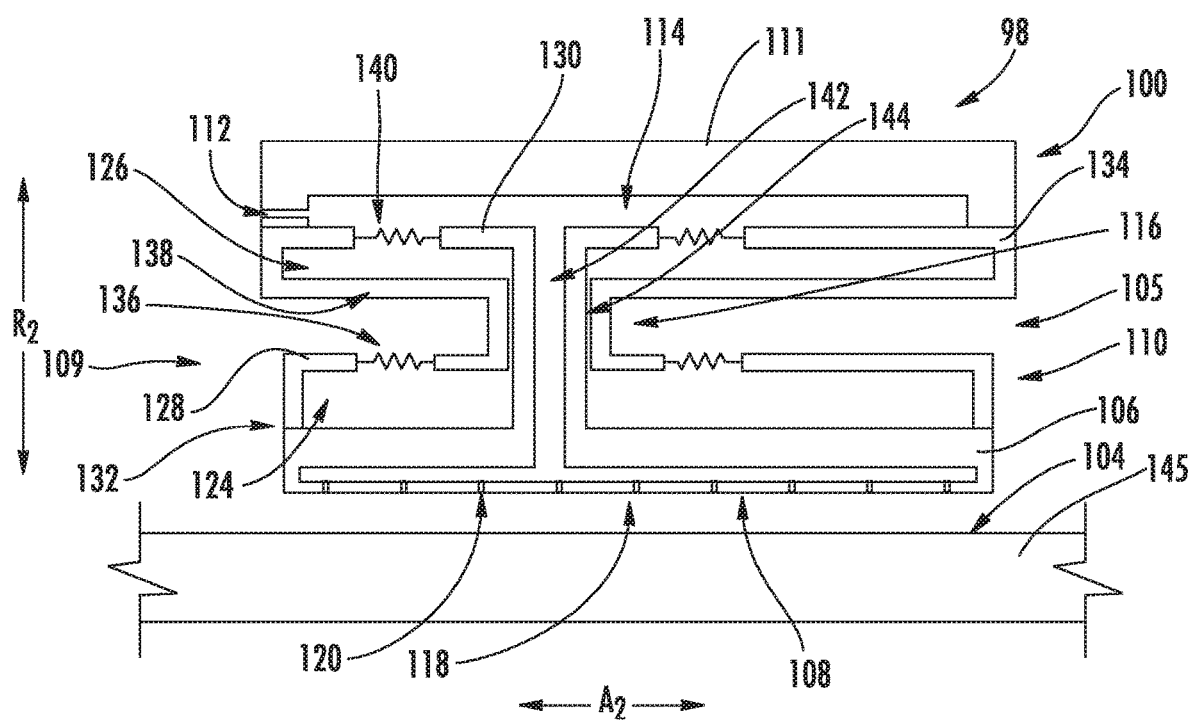
FIG. 5 is a side, schematic, cross-sectional view of a seal in accordance with another exemplary embodiment of the present disclosure.

For example, referring now to FIG. 5, a seal 98 in accordance with another exemplary embodiment of the present disclosure is depicted. The seal 98 may be configured in substantially the same manner as the exemplary seal 98 described above with reference to FIG. 4, and thus the same or similar numbers may refer to same or similar parts. Accordingly, the seal 98 generally defines a first end along the axial direction A2 and a second end along the axial direction A2. The seal 98 also includes a bearing 100, with the bearing 100 defining a high pressure end 109 at the first end of the seal 98 and a low pressure end 110 of the second end of the seal 98. As will be appreciated, once installed in a gas turbine engine, the high pressure end 109 of the bearing 100 will be exposed to a pressure greater than a pressure to which the low pressure end 110 will be exposed.

The bearing 100 includes a bearing pad 106 as well as a damper assembly 105. The bearing pad 106 defines an inner surface 108 and includes a plurality of gas distribution holes 120 disposed across the bearing pad 106 to provide an evenly distributed pressure field within an axial opening 104 for supporting and/or lubricating the rotary component 145.

Additionally, the damper assembly 105 includes a support member, which for the embodiment depicted is configured as a column 116 extending towards the bearing pad 106 for substantially fully supporting the bearing pad 106. However, for the embodiment depicted, the column 116 is not located at a center 118 of the bearing pad 106 along the axial direction A2, and instead is located off-center along the axial direction A2. More particularly, for the embodiment depicted, the column 116 is located along the axial direction A2 closer to the high pressure end 109 of the bearing 100 than the low pressure end 110 of the bearing 100. Such a configuration may allow the bearing 100 of the seal 98 to accommodate the pressure differential between the high pressure end 109 and the low pressure end 110. More particularly, by positioning the column 116 off-center/closer to the high pressure end 109 of the bearing 100, the column 116 may provide greater support at the high pressure end 109 as compared to at the low pressure end 110. Such a configuration may insure the bearing pad 106 does not tilt towards the rotary component 145 and potentially rub against the rotary component 145 at the low pressure end 110 during operation of the gas turbine engine.

It should be appreciated, however, that in other exemplary embodiments, the seal 98, including the bearing 100, may have any other suitable configuration for performing the sealing and lubrication functions, and further may have any other suitable configuration for accommodating the pressure differential between a high pressure end 109 of a bearing 100 of the seal 98 and a low pressure end 110 of a bearing 100 of the seal 98.

Figure 6:
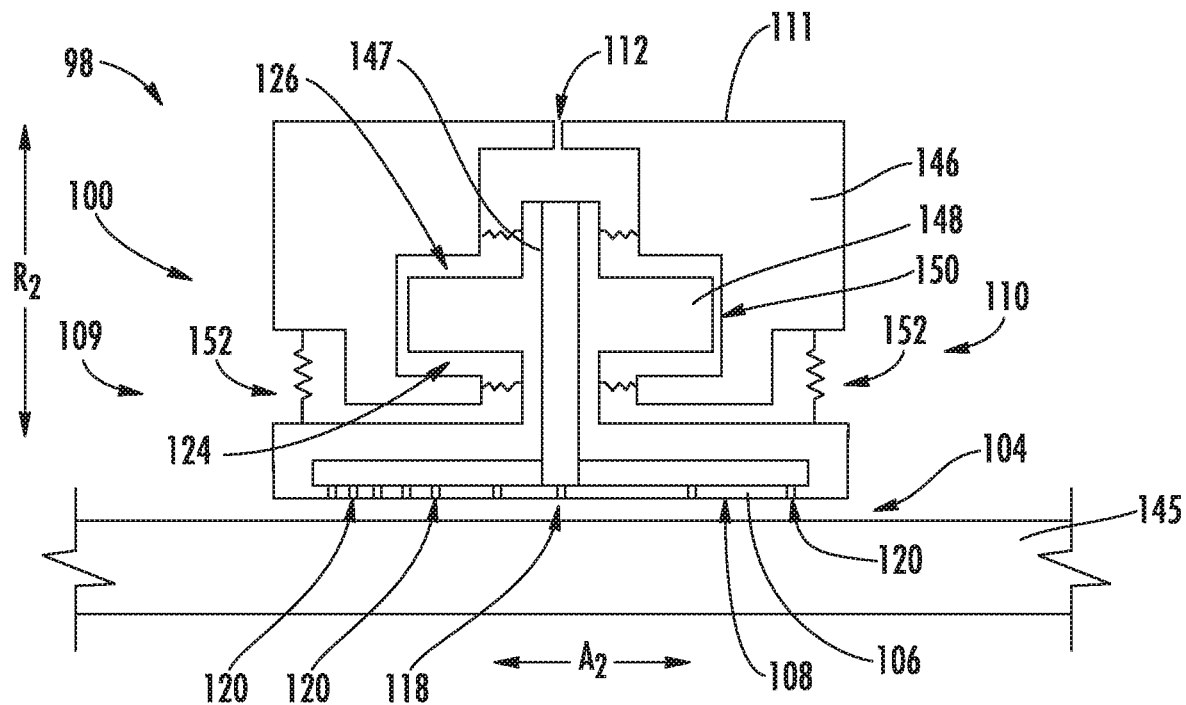
FIG. 6 is a side, schematic, cross-sectional view of a seal in accordance with yet another exemplary embodiment of the present disclosure.

For example, referring now to FIG. 6, a seal 98 in accordance with another exemplary embodiment of the present disclosure is provided. The exemplary seal 98 of FIG. 6 may be configured in a similar manner to the exemplary seal 98 described above, and thus similar numbers may refer to similar parts.

For example, the exemplary seal 98 depicted defines a first end along the axial direction A2 and a second end along the axial direction A2. Additionally, the exemplary seal 98 includes a bearing 100 having a bearing pad 106 and a damper assembly 105. The bearing 100 additionally defines a high pressure end 109 and a low pressure end 110. However, for the embodiment depicted, the damper assembly 105 does not include a support member integrated therein, and instead, the bearing 100 includes a plurality of additional, separate support members 152 arranged proximate the high pressure end 109 of the bearing 100 and proximate the low pressure end 110 of the bearing 100. The damper assembly 105 may act to dampen a movement of the bearing pad 106 relative to a body portion of the seal 98, whereas the support members 152 may act to support a force acting on the bearing pad 106 of the seal 98 along the radial direction R.

Specifically, the damper assembly 105 of the bearing 100 of the exemplary seal 98 depicted generally includes a housing 146 defining at least in part a first fluid damper cavity 124 and a second fluid damper cavity 126. The first fluid damper cavity 124 is spaced from the second fluid damper cavity 126 along the radial direction R2. Additionally, the damper assembly 105 includes a column 147 extending to the bearing pad 106 for providing the bearing pad 106 with a flow of working gas during operation. The column 147 also includes a plunger 148 exposed to the first fluid damper cavity 124 and the second fluid damper cavity 126. The first fluid damper cavity 124 is in fluid communication with the second fluid damper cavity 126 through a channel 150 defined between an outer end of the plunger 148 and the housing 146 of the seal 98. The channel 150 is configured as a clearance gap to resist fluid transfer between the first fluid damper cavity 124 and the second fluid damper cavity 126, providing the dampening functions.

Referring still to FIG. 6, the exemplary seal 98 depicted is also configured for counteracting a pressure differential between the high pressure end 109 of the bearing 100 and the low pressure end 110 of the bearing 100. Specifically, for the embodiment depicted, the bearing pad 106 includes a plurality of gas distribution holes 120 arranged along an inner surface 108 of the bearing pad 106. However, for the embodiment depicted, the plurality of gas distribution holes 120 are asymmetrically configured along the axial direction A2. Specifically, for the embodiment depicted the plurality of gas distribution holes 120 are asymmetrically configured along the axial direction A2 to provide a greater amount of working gas at a low pressure half of the inner surface 108 (defined from the center 118 of the bearing pad 106 to the low pressure end 110 of the bearing 100 along the axial direction A2) as compared to an amount of working gas provided at a high pressure half of the inner surface 108 (defined from the center 118 of the bearing pad 106 to the high pressure end 109 of the bearing 100 along the axial direction A2). Particularly for the embodiment depicted, the bearing 100 includes a greater number of gas distribution holes 120 on the low pressure half of the bearing pad 106 as compared to the number of gas distribution holes 120 on the high pressure half of the bearing pad 106. However, in other embodiments, the bearing pad 106 may additionally, or alternatively, define larger gas distribution holes 120 on the low pressure half of the bearing pad 106 as compared to a size of the gas distribution holes 120 on the high pressure half of the bearing pad 106.

The increased amount of working gas distributed at the low pressure half of the bearing pad 106 may provide increased resistance along the radial direction R2 at the low pressure end 110 of the bearing 100 during operation. Accordingly, a pressure differential between the high pressure end 109 and the low pressure end 110 of the bearing 100 may be counteracted by the asymmetrically distributed gas distribution holes 120 to prevent the bearing pad 106 from tilting towards the rotary component 145 and/or rubbing against the rotary component 145 at the low pressure end 110.

Figure 7:
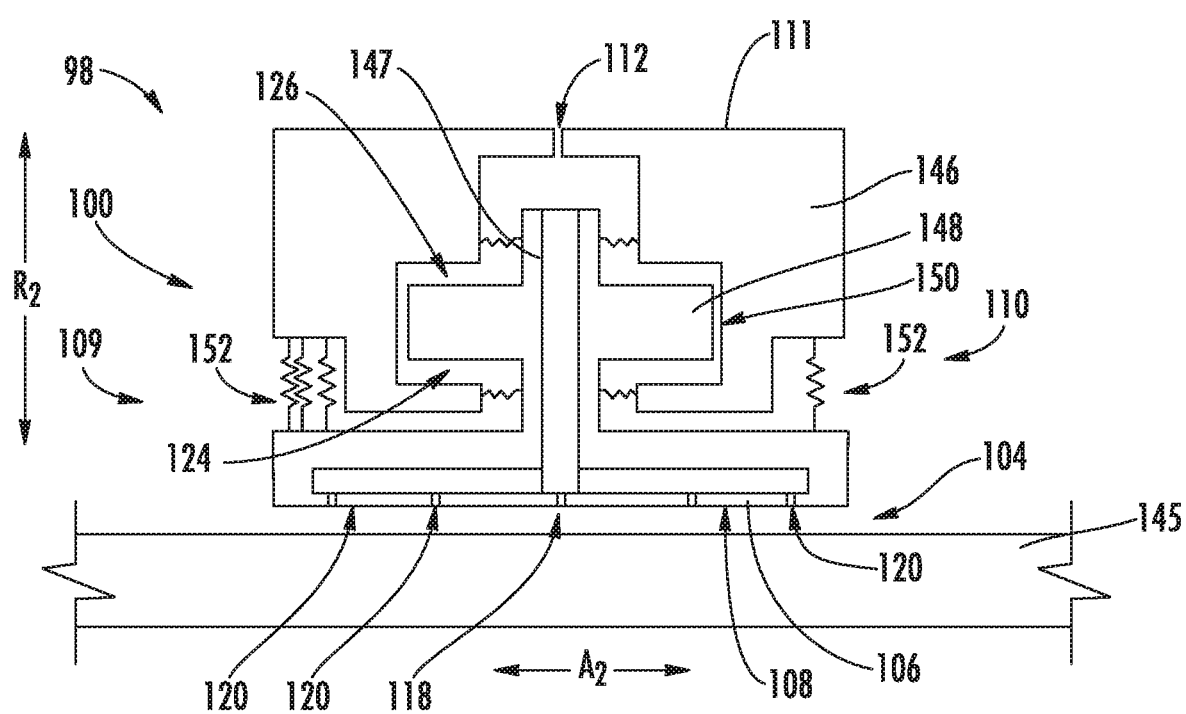
FIG. 7 is a side, schematic, cross-sectional view of a seal in accordance with still another exemplary embodiment of the present disclosure.

However, in other embodiments, the pressure differential may be counteracted in any other suitable manner. For example, referring now to FIG. 7, a seal 98 in accordance with still another exemplary embodiment is provided. The exemplary seal 98 of FIG. 7 may be configured in substantially the same manner as the exemplary seal 98 of FIG. 6, and accordingly the same or similar numbers may refer to the same or similar part. For example, as is depicted, the seal 98 includes a bearing 100 defining a high pressure end 109 and a low pressure end 110. The bearing 100 additionally includes a bearing pad 106, a damper assembly 105, and a plurality of support members 152. In certain embodiments, one or more of the support members 152 may be configured as stand-alone springs, or alternatively may be spring portions integrated into a housing of the bearing 100.

In order to accommodate a pressure differential between the high pressure end 109 of the bearing 100 and the low pressure end 110 of the bearing 100, the plurality of support members 152 of the bearing 100 are asymmetrically configured along the axial direction A2. Specifically, the seal 98 includes more support (i.e., greater resistance and stiffness) proximate the high pressure end 109 of the bearing 100 as compared to the amount of support provided proximate the low pressure end 110 of the bearing 100. The amount of additional support provided at the high pressure end 109 of the bearing 100 as compared to the low pressure end 110 of the bearing 100 may be driven by the anticipated pressure differential between the high pressure end 109 of the bearing 100 and the low pressure end 110 of the bearing 100 during operation. For example, for certain embodiments, the bearing 100 may include at least about 10% additional support (e.g. resistance and stiffness) at the high pressure end 109 as compared to at the low pressure end 110. However, in other embodiments, the bearing 100 may further include at least about 15% additional support, at least about 25% additional support, or at least about 50% additional support at the high pressure end 109 of the bearing 100 as compared to the low pressure end 110 of the bearing 100. Additional support provided at the high pressure end 109 of the bearing 100 may allow the seal 98 to accommodate a pressure differential between the first end of the seal 98/high pressure end 109 of the bearing 100 and the second end of the seal 98/low pressure end 110 of the bearing 100.

Figure 8:
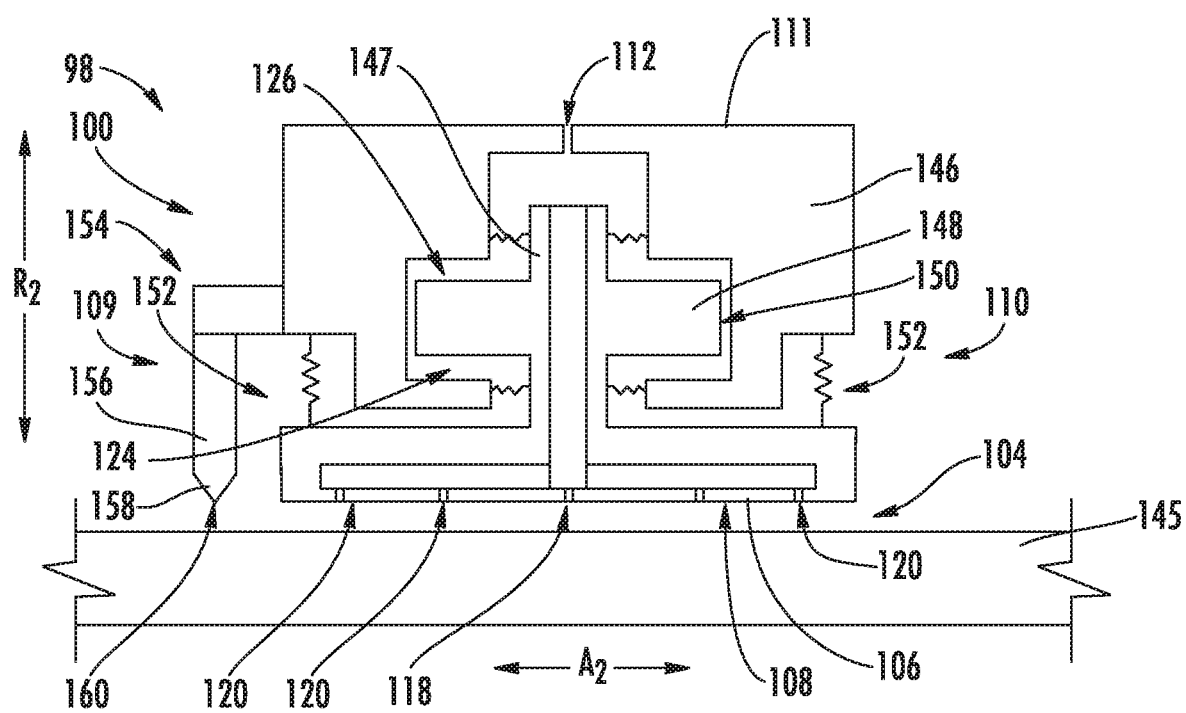
FIG. 8 is a side, schematic, cross-sectional view of a seal in accordance with yet another exemplary embodiment of the present disclosure.

Furthermore, in still other exemplary embodiments, the pressure differential may be counteracted in any other suitable manner. For example, referring now to FIG. 8, a seal 98 in accordance with yet another exemplary embodiment is provided. The exemplary seal 98 of FIG. 8 may be configured in substantially the same manner as the exemplary seal 98 of FIG. 6, and accordingly the same or similar numbers may refer to the same or similar part.

The seal 98 includes a bearing 100 defining defines a high pressure end 109 and a low pressure end 110. The bearing 100 additionally includes a bearing pad 106, a damper assembly 105, and a plurality of support members 152. In order to accommodate a pressure differential between the high pressure end 109 of the bearing 100 and the low pressure end 110 of the bearing 100, the seal 98 further includes a mechanical seal assembly 154 attached to or formed integrally with the bearing pad 106 of the bearing 100. The exemplary mechanical seal assembly 154 depicted includes an extension 156 attached to or formed integrally with the bearing pad 106 at the high pressure end 109 of the seal 98 and extending generally along the axial direction A2 away from the bearing pad 106. The exemplary mechanical seal assembly 154 depicted also includes a seal tooth 158 extending generally along the radial direction R2 from the extension 156 towards a central axis of the seal 98 and towards the rotary member 145. Although not depicted, the seal tooth 158 may additionally extend substantially continuously along a circumferential direction C2 of the seal 98. The seal tooth 158 includes a tip 160 that, for the embodiment depicted, is positioned closer to the rotary member 145 along the radial direction R2 than the inner surface 108 of the bearing pad 106. The seal tooth 158 may form a partial seal with the rotary member 145. Accordingly, the seal tooth 158 may shield the bearing pad 106 of the bearing 100 from a pressure differential between the high pressure end 109 of the bearing 100 and the low pressure end 110 of the bearing 100, such that the effects of the pressure differential are minimized.

Further, still, in other exemplary embodiments, the mechanical seal assembly 154 may be configured in any other suitable manner. For example, referring now to FIG. 9, a seal 98 in accordance with yet another exemplary embodiment is provided. The exemplary seal 98 of FIG. 9 may be configured in substantially the same manner as the exemplary seal 98 of FIGS. 2 through 4, and accordingly the same or similar numbers may refer to the same or similar part.

The seal 98 includes a bearing 100 defining a high pressure end 109 and a low pressure end 110. The bearing 100 additionally includes a bearing pad 106 and a damper assembly 105. In order to accommodate a pressure differential between the high pressure end 109 of the bearing 100 and the low pressure end 110 of the bearing 100, the seal 98 further includes an exemplary mechanical seal assembly 154 attached to or formed integrally with a housing 113 of the seal 98. The exemplary mechanical seal assembly 154 depicted includes multiple labyrinth tooth seals. Specifically, the mechanical seal assembly 154 includes a first seal member and a second seal member. For the embodiment depicted, the first seal member is configured as a first labyrinth tooth seal 162 attached to or formed integrally with the housing 113 at the low pressure end 110 and the second seal member is configured as a second labyrinth tooth seal 164 attached to or formed integrally with the housing 113 at the high pressure end 109. The first and second labyrinth tooth seals 162, 164 extend generally along the radial direction R2 towards the rotary component 145 and towards a central axis of the seal 98.

For the embodiment depicted, the first and second labyrinth tooth seals 154, 156 each define a radially inner tip 166. The labyrinth tooth seals additionally define a clearance with the rotary component 145. Specifically, the first labyrinth tooth seal 162 defines a first clearance 168 along the radial direction R2 with the rotary component 145 and the second labyrinth tooth seal 164 defines a second clearance 170 along the radial direction R2 with the rotary component 145. For the exemplary embodiment depicted, the first clearance 168 of the first labyrinth tooth seal 162 is equal to the second clearance 170 of the second labyrinth tooth seal 164. Notably, for the embodiment depicted, the bearing pad 106 additionally defines a bearing pad clearance 172 along the radial direction R2 between the inner surface 108 and the rotary component 145. For the embodiment depicted, the first clearance 168 of the first labyrinth tooth seal 162 is equal to the bearing pad clearance 172 of the bearing pad 106, which is thus also equal to the second clearance 170 of the second labyrinth tooth seal 164.

Notably, the seal 98 additionally defines a bearing cavity 174 and one or more pressurization channels. The bearing cavity 174 is defined around the bearing pad 106, between the first and second labyrinth tooth seals 154, 156. Additionally, the pressurization channels depicted include a first pressurization channel 176 and a second pressurization channel 178. The first pressurization channel 176 extends through the housing 113 of the seal 98 and in airflow communication with the bearing cavity 174, and is located proximate the low pressure end 110. The second pressurization channel 178 also extends through the housing 113 of the seal 98 and in airflow communication with the bearing cavity 174, and is located proximate the high pressure end 109.

During operation of the exemplary seal 98 depicted, the exemplary seal 98 defines a pressure PA in the bearing cavity 174, a pressure PB at a location outside the seal 98 at the low pressure end 110 (i.e., a first pressure location 180), and a pressure PC at a location outside the seal at the high pressure end 109 (i.e., a second pressure location 182). Additionally, the working gas provided to the bearing 100 defines a pressure PD. As depicted, the working gas is provided to the bearing 100 through a gas inlet 112 defined by the seal 98. The seal 98 functions as a seal between the first pressure location 180 and the second pressure location 182, between the bearing pad 106 and the rotary component 145. The bearing cavity 174 is maintained at the pressure PA through the first and second pressurization channels 176, 178, which may be in airflow communication with a location within the gas turbine engine maintained at the pressure PA. Notably, in order to maintain a desired airflow through the bearing 100, the pressure PD of the working gas provided to the bearing 100 may be greater than the pressure PA of the bearing cavity 174. Additionally, for the embodiment depicted, the pressure PC of the second pressure location 182 is greater than the pressure PB of the first pressure location 180. Inclusion of the mechanical seal assembly allows for the pressure PA of the bearing cavity 174 to be less than the pressures PB, PC of the first and second pressure locations 180, 182. Lastly, the pressure PD of the working gas provided to the bearing 100 may be equal to or greater than the pressure PC of the second pressure location 182. In sum, the pressures depicted may define the following order of magnitude: PA<PB<PC≤PD.

It should be appreciated, that in certain exemplary embodiments, as will be discussed in greater detail below, the exemplary seal 98 of FIG. 9 may be incorporated into a nozzle stage within a compressor section and/or a turbine section of the gas turbine engine (see FIGS. 14 through 16). For example, in certain exemplary embodiments, the seal 98 may be incorporated into a compressor guide vane stage of a compressor, such as a third stage compressor guide vane of an HP compressor. With such an exemplary embodiment, the pressures PC, PD may be equal to a third stage pressure of the compressor, the pressure PB may be equal to a second stage pressure of the compressor, and a pressure PA may be equal to a first stage pressure of the compressor.

However, in other exemplary embodiments, seal 98 described above with reference to FIG. 9 may define any other suitable airflow configurations. For example, referring now to FIG. 10, a seal 98 in accordance with yet another exemplary embodiment is provided. The exemplary seal 98 of FIG. 10 is configured in substantially the same manner as the exemplary seal 98 of FIG. 9, and accordingly the same or similar numbers may refer to the same or similar part. For example, the exemplary seal 98 defines a pressure PB at a first pressure location 180 and a pressure PC at a second pressure location 182. However, for the embodiment depicted, the bearing cavity 174 of the exemplary seal 98 defines a pressure PD, and the working gas is provided to the bearing 100 at a pressure PE. The pressure PE of the working gas provided to the bearing 100 may be greater than the pressure PD defined by the bearing cavity 174, such that the seal 98 defines a pressure change through the bearing 100. Notably, the bearing cavity 174 is maintained at the pressure PD through pressurization channels 176, 178, which provide airflow to the bearing cavity 174 at the pressure PD. The pressures PE, PD may be greater than the pressures PB, PC such that the airflow through the bearing 100 and to the bearing cavity 174 leaks out to the first and second pressure locations 180, 182, between the rotary component 145 and the first and second labyrinth tooth seals 154, 156. In sum, the pressures depicted may define the following order of magnitude: PB<PC<PD<PE.

Figure 9:
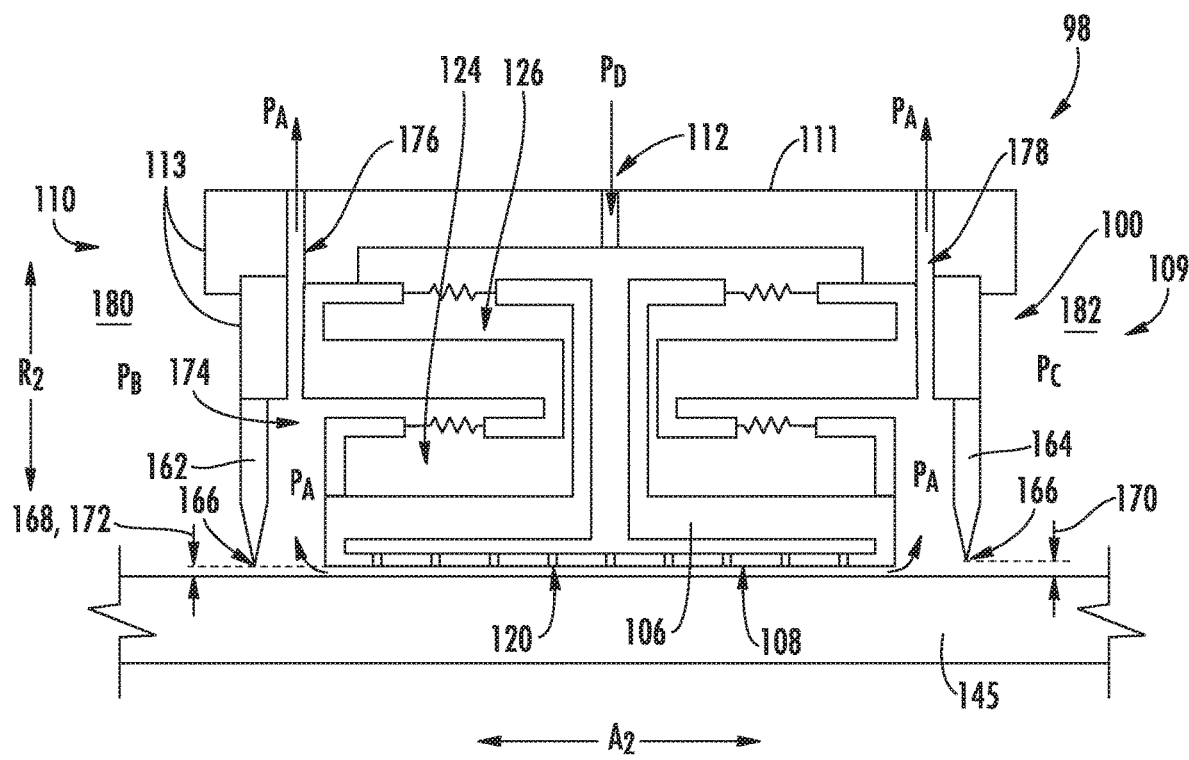
FIG. 9 is a side, schematic, cross-sectional view of a seal in accordance with still another exemplary embodiment of the present disclosure.
Figure 10:
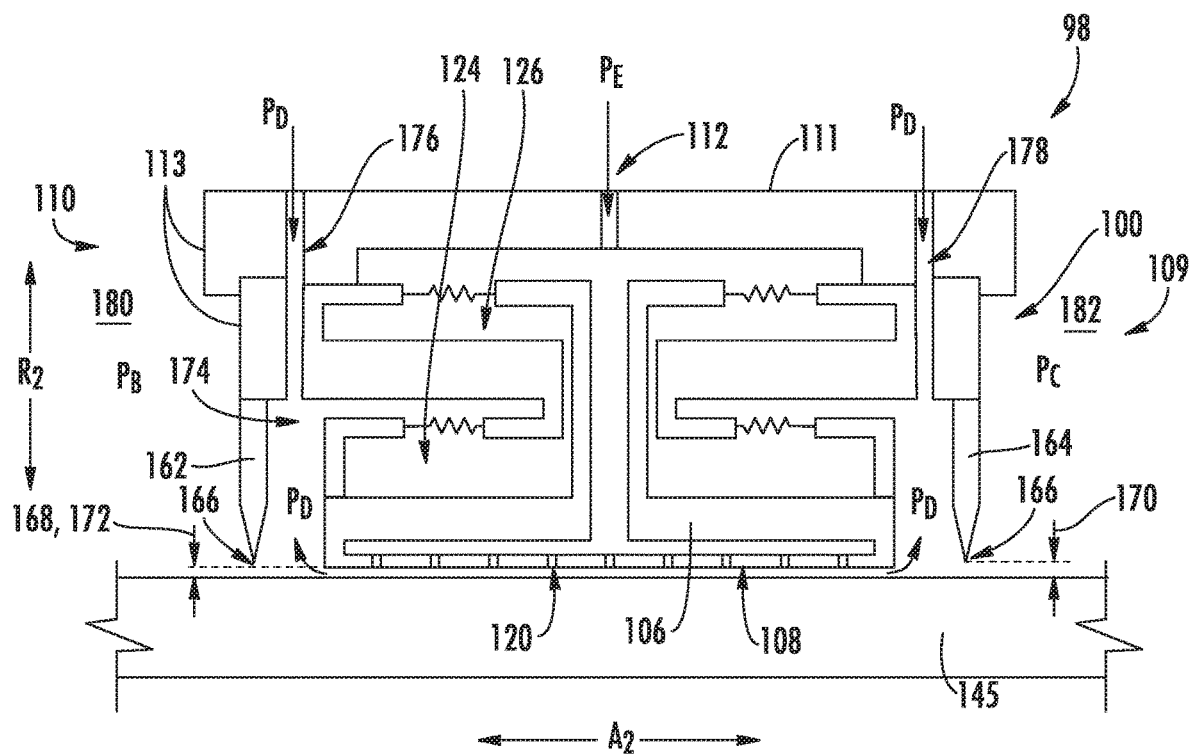
FIG. 10 is a side, schematic, cross-sectional view of a seal in accordance with yet another exemplary embodiment of the present disclosure.
Figure 14:
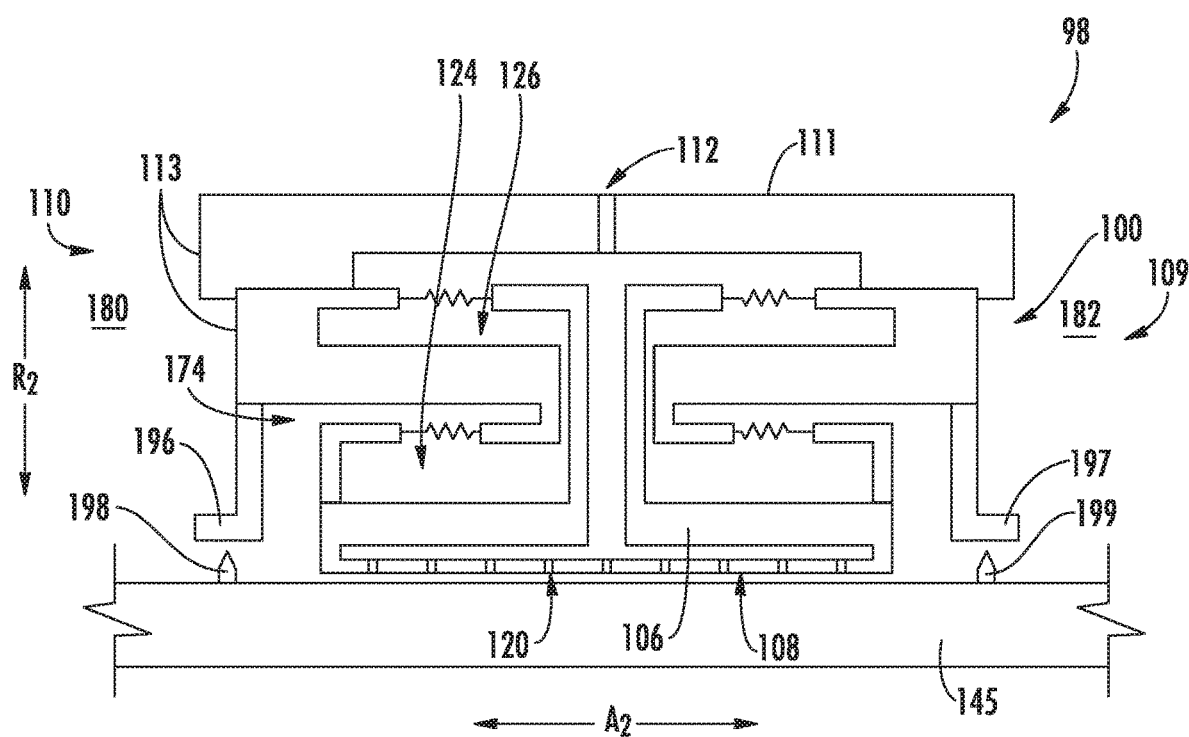
FIG. 14 is a side, schematic, cross-sectional view of a seal in accordance with yet another exemplary embodiment of the present disclosure.
Figure 15:
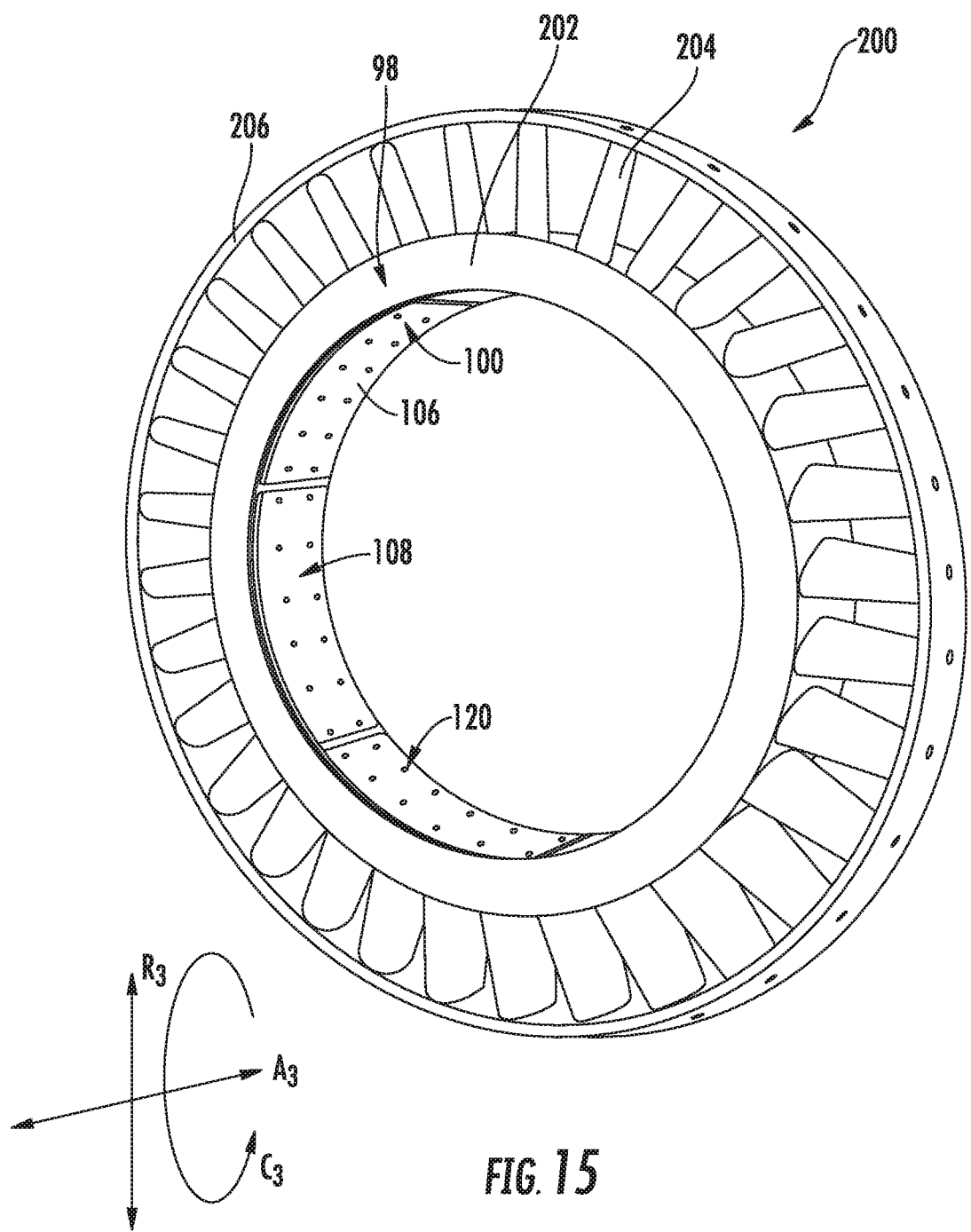
FIG. 15 is a perspective view of a nozzle section in accordance with an exemplary embodiment of the present disclosure.
Figure 16:
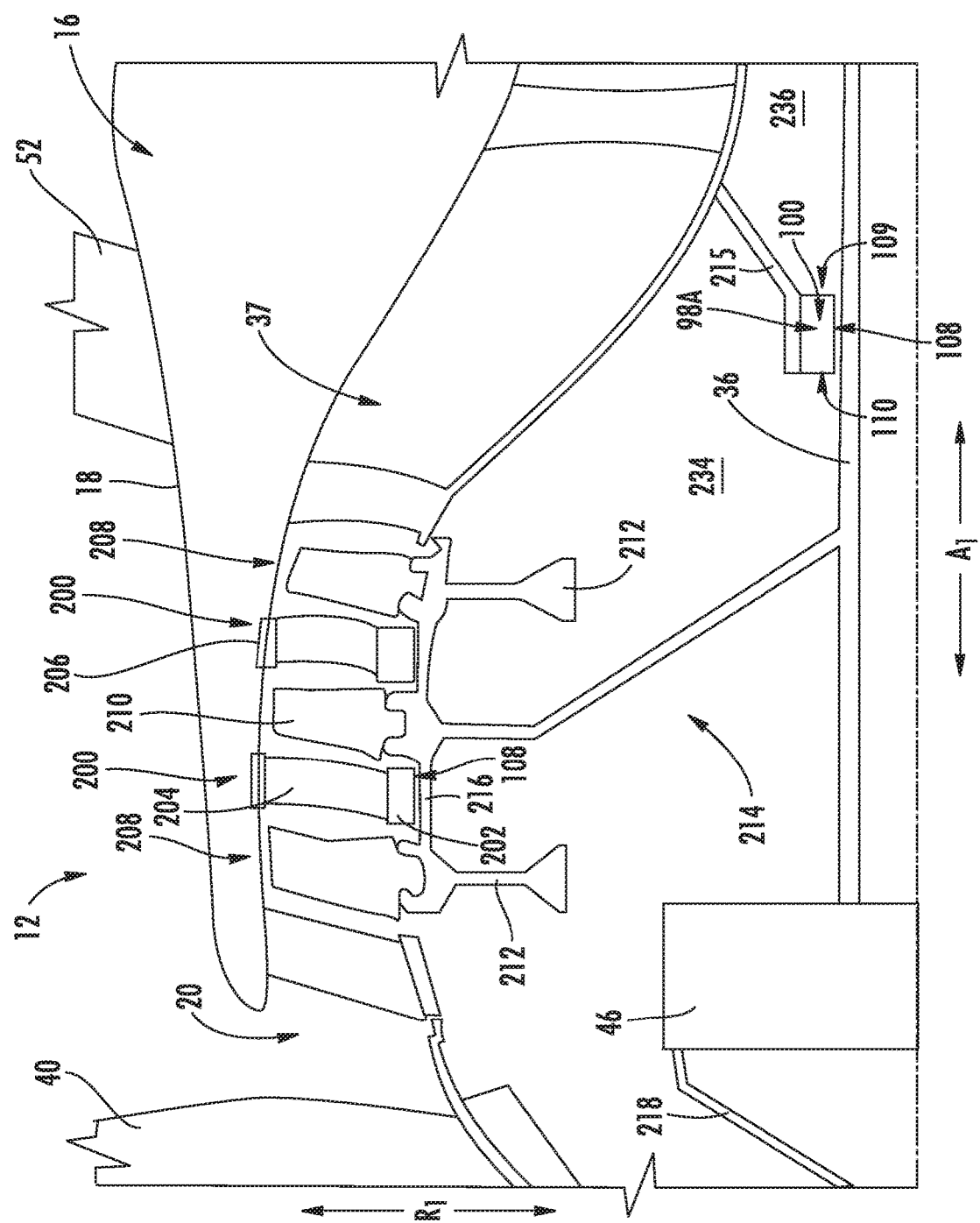
FIG. 16 is a side, schematic view of a compressor section of a gas turbine engine in accordance with an exemplary embodiment of the present disclosure.
Figure 17:
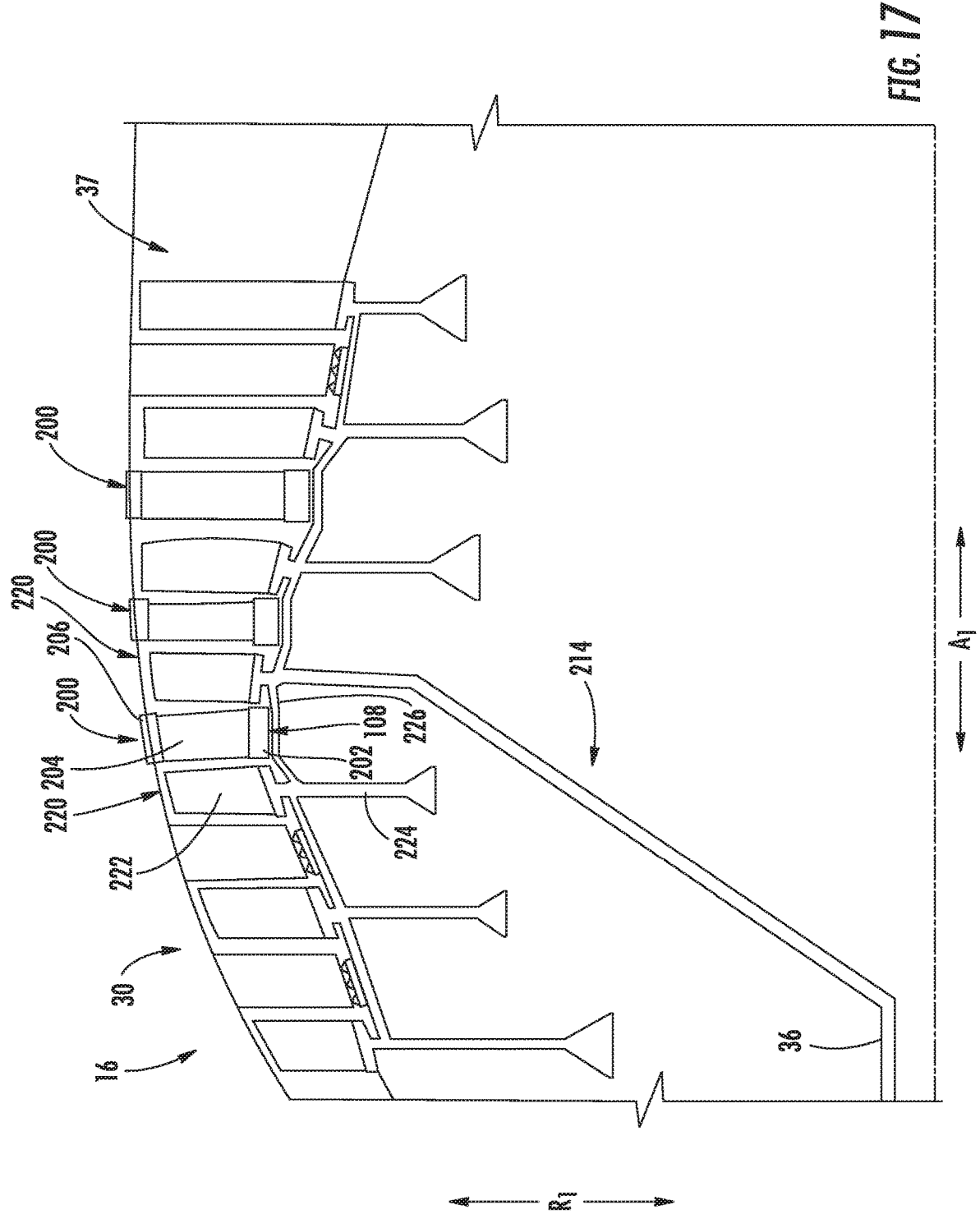
FIG. 17 is a side, schematic view of a turbine section of a gas turbine engine in accordance with an exemplary embodiment of the present disclosure.

As with the exemplary embodiment of FIG. 9, the exemplary seal 98 depicted in FIG. 10 may be integrated into a nozzle stage within a compressor section and/or a turbine section of a gas turbine engine (see FIGS. 14 through 16). For example, in certain exemplary embodiments, the seal 98 may be incorporated into a compressor guide vane stage of a compressor, such as a third stage compressor guide vane. With such an exemplary embodiment, the pressure PB may be equal to a second stage pressure of the compressor, the pressure PC may be equal to a third stage pressure of the compressor, the pressure PD may be equal to a fourth stage pressure of the compressor, and the pressure PE may be equal to a fifth stage pressure of the compressor.

Figure 11:
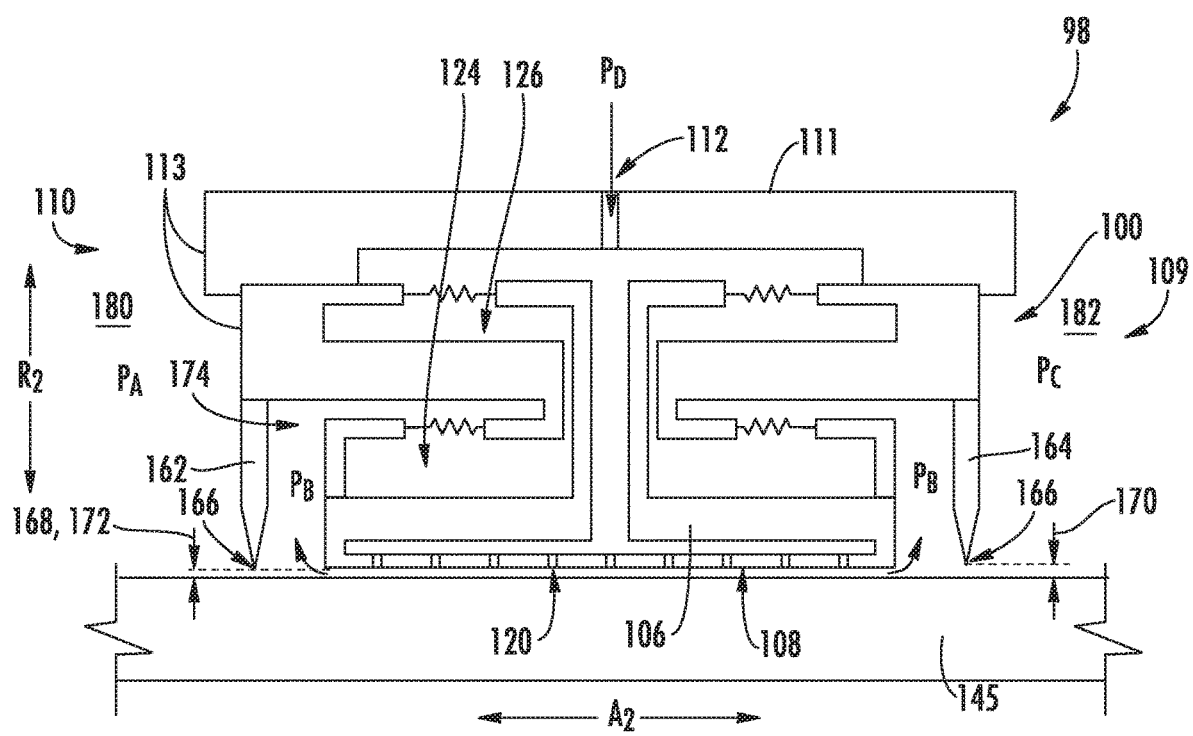
FIG. 11 is a side, schematic, cross-sectional view of a seal in accordance with still another exemplary embodiment of the present disclosure.

Referring now to FIG. 11, a seal 98 in accordance with still another exemplary embodiment of the present disclosure is provided. The exemplary seal 98 of FIG. 11 may be configured in substantially the same manner as the exemplary seal 98 of FIG. 9, and accordingly the same or similar numbers may refer to the same or similar part.

For example, the seal 98 includes a bearing 100 defining a high pressure end 109 and a low pressure end 110. The bearing 100 additionally includes a bearing pad 106 and a damper assembly 105. In order to accommodate a pressure differential between the high pressure end 109 of the bearing 100 and the low pressure end 110 of the bearing 100, the seal 98 further includes an exemplary mechanical seal assembly 154 attached to or formed integrally with a housing 113 of the seal 98. The exemplary mechanical seal assembly 154 depicted includes multiple labyrinth tooth seals. Specifically, the mechanical seal assembly 154 includes a first labyrinth tooth seal 162 attached to or formed integrally with the housing 113 at the low pressure end 110 and a second labyrinth tooth seal 164 attached to or formed integrally with the housing 113 at the high pressure end 109. The first and second labyrinth tooth seals 162, 164 extend generally along the radial direction R2 towards the rotary component 145 and towards a central axis of the seal 98.

Notably, the seal 98 additionally defines a bearing cavity 174 around the bearing pad 106, between the first and second labyrinth tooth seals 154, 156. However, for the embodiment depicted, the housing 113 of the seal 98 does not define any pressurization channels. Accordingly, during operation of the exemplary seal 98 depicted, the exemplary seal 98 defines a pressure PA at a first pressure location 180, a pressure PC at a second pressure location 182, and a pressure PB within the bearing cavity 174. Additionally, the working gas provided to the bearing 100 defines a pressure PD. The seal 98 functions as a seal 98 between the first pressure location 180 and the second pressure location 182. The bearing cavity 174 is maintained at the pressure PB, which may be less than the pressure PC at the second pressure location 182 and greater than a pressure PA at the first pressure location 180. The airflow through the bearing 100 and within the bearing cavity 174 may leak between the first labyrinth tooth seal 162 and the rotary component 145 to the first pressure location 180. In sum, the pressures depicted may define the following order of magnitude: PA<PB<PC<PD.

As with the embodiments above, the exemplary seal 98 of FIG. 11 may be incorporated into a nozzle stage within a compressor section and/or a turbine section of the gas turbine engine (see FIGS. 14 through 16). For example, in certain exemplary embodiments, the seal 98 may be incorporated into a compressor guide vane stage of a compressor, such as a third stage compressor guide vane. With such an exemplary embodiment, the pressure PD may be equal to a fourth stage pressure of the compressor, the pressure PC may be equal to a third stage pressure of the compressor, and a pressure PA may be equal to the second stage pressure of the compressor.

Figure 12:
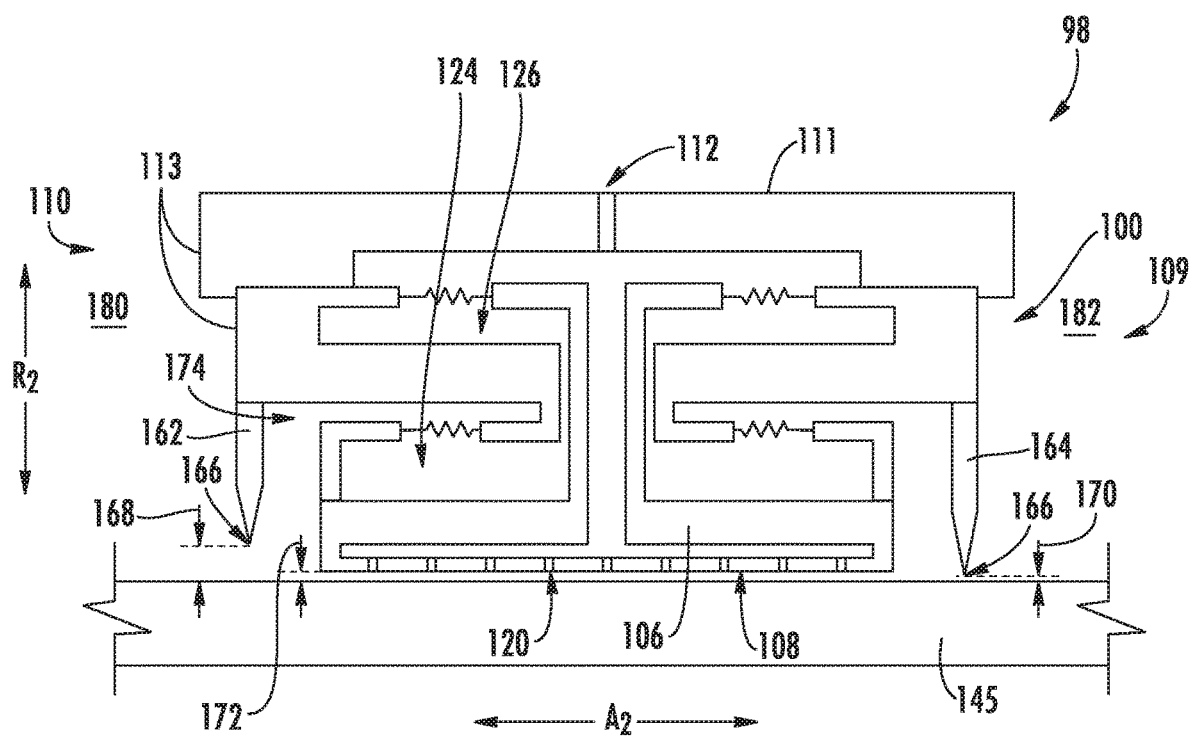
FIG. 12 is a side, schematic, cross-sectional view of a seal in accordance with yet another exemplary embodiment of the present disclosure.

Referring now to FIG. 12, a seal 98 in accordance with yet another exemplary embodiment of the present disclosure is provided. The exemplary seal 98 of FIG. 12 may be configured in substantially the same manner as the exemplary seal 98 of FIG. 9, and accordingly the same or similar numbers may refer to the same or similar part.

For example, the seal 98 includes a bearing 100 defining a high pressure end 109 and a low pressure end 110. The bearing 100 additionally includes a bearing pad 106 and a damper assembly 105. In order to accommodate a pressure differential between the high pressure end 109 of the bearing 100 and the low pressure end 110 of the bearing 100, the seal 98 further includes an exemplary mechanical seal assembly 154 attached to or formed integrally with a housing 113 of the seal 98. The exemplary mechanical seal assembly 154 depicted includes multiple labyrinth tooth seals. Specifically, the mechanical seal assembly 154 includes a first labyrinth tooth seal 162 attached to or formed integrally with the housing 113 at the low pressure end 110 and a second labyrinth tooth seal 164 attached to or formed integrally with the housing 113 at the high pressure end 109. The first and second labyrinth tooth seals 154, 156 extend generally along the radial direction R2 towards the rotary component 145 and towards a central axis of the seal 98.

For the embodiment depicted, the first and second labyrinth tooth seals 154, 156 each define a radially inner tip 166. The labyrinth tooth seals additionally define a clearance with the rotary component 145. Specifically, the first labyrinth tooth seal 162 defines a first clearance 168 along the radial direction R2 with the rotary component 145 and the second labyrinth tooth seal 164 defines a second clearance 170 along the radial direction R2 with the rotary component 145. For the exemplary embodiment depicted, the first clearance 168 of the first labyrinth tooth seal 162 is different than the second clearance 170 of the second labyrinth tooth seal 164. More particularly, the first clearance 168 of the first labyrinth tooth seal 162 is greater than the second clearance 170 of the second labyrinth tooth seal 164. Notably, for the embodiment depicted, the bearing pad 106 additionally defines a bearing pad clearance 172 along the radial direction R2 between the inner surface 108 and the rotary component 145. For the embodiment depicted, the first clearance 168 of the first labyrinth tooth seal 162 is greater than the bearing pad clearance 172 of the bearing pad 106, which is greater than the second clearance 170 of the second labyrinth tooth seal 164. Such a configuration may prevent a high pressure airflow from the high pressure end 109 of the bearing 100 from jettisoning between the bearing pad 106 and a rotary component 145, creating an undesirable amount of tilt or other asymmetries.

Figure 13:
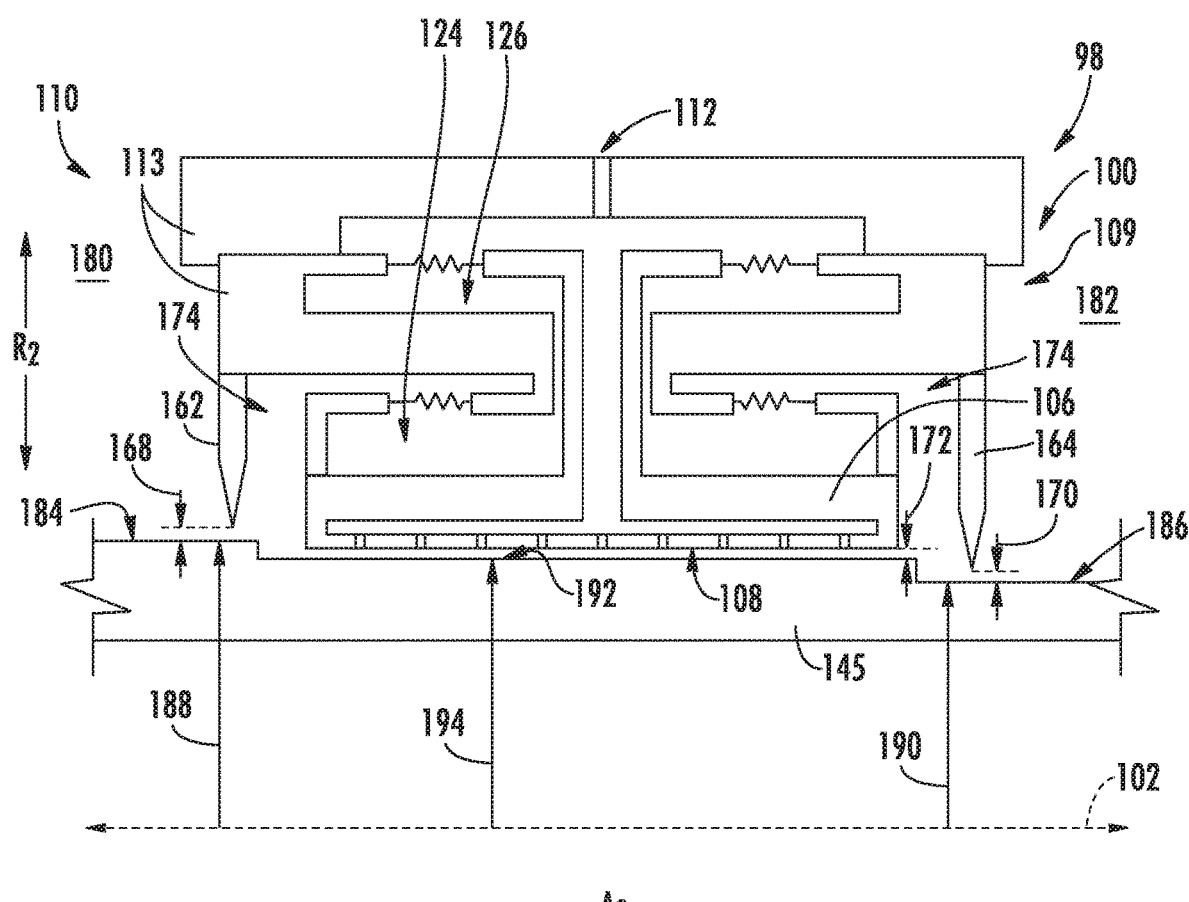
FIG. 13 is a side, schematic, cross-sectional view of a seal in accordance with still another exemplary embodiment of the present disclosure.

Referring now to FIG. 13, a seal 98 in accordance with still another exemplary embodiment of the present disclosure is provided. The exemplary seal 98 of FIG. 13 may be configured in substantially the same manner as the exemplary seal 98 of FIG. 9, and accordingly the same or similar numbers may refer to the same or similar part.

For example, the seal 98 includes a bearing 100 defining a high pressure end 109 and a low pressure end 110. The bearing 100 additionally includes a bearing pad 106 and a damper assembly 105. In order to accommodate a pressure differential between the high pressure end 109 of the bearing 100 and the low pressure end 110 of the bearing 100, the seal 98 further includes an exemplary mechanical seal assembly 154 attached to or formed integrally with a housing 113 of the seal 98. The exemplary mechanical seal assembly 154 depicted includes multiple labyrinth tooth seals. Specifically, the mechanical seal assembly 154 includes a first labyrinth tooth seal 162 attached to or formed integrally with the housing 113 at the low pressure end 110 and a second labyrinth tooth seal 164 attached to or formed integrally with the housing 113 at the high pressure end 109. The first and second labyrinth tooth seals 154, 156 extend generally along the radial direction R2 towards the rotary component 145 and towards a central axis of the seal 98.

For the embodiment depicted, the first and second labyrinth tooth seals 154, 156 additionally define a clearance with the rotary component 145. Specifically, the first labyrinth tooth seal 162 defines a first clearance 168 along the radial direction R2 with the rotary component 145 and the second labyrinth tooth seal 164 defines a second clearance 170 along the radial direction R2 with the rotary component 145. For the exemplary embodiment depicted, the first clearance 168 of the first labyrinth tooth seal 162 is equal to the second clearance 170 of the second labyrinth tooth seal 164. Notably, for the embodiment depicted, the bearing pad 106 additionally defines a bearing pad clearance 172 along the radial direction R2 between the inner surface 108 and the rotary component 145. For the embodiment depicted, the first and second clearances 168, 170 of the first and second labyrinth tooth seals 162, 164 are substantially equal to the bearing pad clearance 172 of the bearing pad 106.

However, for the embodiment depicted, the rotary component 145 includes lands for the seals 162, 164 that are positioned at different radial locations. Specifically, the rotary component 145 defines a first land 184 for interfacing with the first labyrinth tooth seal 162 and a second land 186 for interfacing with the second labyrinth tooth seal 164. The first land 184 of the rotary component 145 defines a first radius 188 along the radial direction R2, and similarly, the second land 186 of the rotary component 145 defines a second radius 190 along the radial direction R2. For the embodiment depicted, the first radius 188 of the first land 184 is greater than the second radius 190 of the second land 186.

Furthermore, for the embodiment depicted, the rotary component 145 includes a support surface 192 located inward of the bearing pad 106 of the bearing 100, configured to be supported by the bearing 100. The support surface 192 additionally defines a radius 194 along the radial direction R2. For the embodiment depicted, the first radius 188 of the first land 184 is greater than the radius 194 of the support surface 192, and further for the embodiment depicted, the second radius 190 of the second land 186 is less than the radius 194 of the support surface 192. Such a configuration may insure that if an air pressure outside the bearing cavity 174 (e.g., at the first pressure location 180 or at the second pressure location 182) is greater than an air pressure within the bearing cavity 174, a flow of such air between the respective labyrinth tooth seal 162, 164 and the lands 184, 186 of the rotary component 145 does not flow directly between the bearing pad 106 and support surface 192 of the rotary component, which may otherwise increase a gap between the bearing pad 106 and the support surface 192 of the rotary component 145 on one side of the bearing pad 106.

It should be appreciated that for the discussions herein, the use of "greater than" and "less than" with respect to, e.g., radii, clearances, etc., may refer to relative measurements that are at least about five percent (5%) different relative to the smaller measurement. For example, in certain embodiments, use of such relative terms may refer to measurements that are at least about ten percent (10%) different, at least about fifteen (15%) percent different, or at least about twenty (20%) percent different relative to the smaller measurement.

Referring now to FIG. 14, a seal 98 in accordance with yet another exemplary embodiment of the present disclosure is provided. The exemplary seal 98 of FIG. 14 may be configured in substantially the same manner as the exemplary seal 98 of FIG. 9, and accordingly the same or similar numbers may refer to the same or similar part.

For example, the seal 98 includes a bearing 100 defining a high pressure end 109 and a low pressure end 110. The bearing 100 additionally includes a bearing pad 106 and a damper assembly 105. In order to accommodate a pressure differential between the high pressure end 109 of the bearing 100 and the low pressure end 110 of the bearing 100, the seal 98 further includes an exemplary mechanical seal assembly 154 attached to or formed integrally with a housing 113 of the seal 98.

However, for the exemplary embodiment depicted, the exemplary mechanical seal assembly 154 includes one or more seal pads attached to or formed integrally with the housing 113. Additionally, for the embodiment depicted, the rotary component 145 includes multiple labyrinth tooth seals, and the one or more seal pads are configured to form a seal with the multiple labyrinth tooth seals. Specifically, the mechanical seal assembly 154 includes a first seal pad 196 attached to or formed integrally with the housing 113 at the low pressure end 110 and a second seal pad 197 attached to or formed integrally with the housing 113 at the high pressure end 109. The first and second seal pads 196, 197 extend generally along the axial direction A2. Additionally, the rotary component includes a first labyrinth tooth seal 198 attached to or formed integrally with the rotary component 145 at a complementary location to the first seal pad 196, and a second labyrinth tooth seal 199 attached to or formed integrally with the rotary component 145 at a complementary location to the second seal pad 197. The first seal pad 196 and first labyrinth tooth seal 198 may together allow for the bearing cavity 174 to be maintained at a pressure different than a pressure at the first pressure location 180, and similarly the second seal pad 197 and second labyrinth tooth seal 199 may together allow for the bearing cavity 174 to be maintained at a pressure different than a pressure at the second pressure location 182.

A seal 98 in accordance with one or more embodiments of the present disclosure may allow the seal 98 to perform the dual functions of supporting and/or lubricating a rotary component 145 (as a "bearing"), as well as sealing off a high pressure end 109 from a low pressure end 110 (as a "seal"). Specifically, a seal 98 in accordance with one or more embodiments of the present disclosure may allow the seal 98 to seal-off a high pressure end 109 from a low pressure end 110 while accommodating the pressure differential therebetween. Inclusion of a seal 98 in accordance with one or more the above embodiments may result in a less complex design for a gas turbine engine.

Further, as is discussed in greater detail below, a seal 98 in accordance with an exemplary embodiment of the present disclosure may be incorporated into, e.g., the exemplary turbofan engine 12 described above with reference FIG. 1. Additionally, a seal 98 in accordance with an exemplary embodiment of the present disclosure may be combined with another component and incorporated into, e.g., the exemplary turbofan engine 12 described above with reference FIG. 1. For example, referring now to FIG. 14, a seal 98 in accordance with an exemplary embodiment of the present disclosure is depicted integrated into a nozzle stage 200, such as a turbine nozzle stage or a compressor nozzle stage. The exemplary nozzle stage 200 depicted includes a base 202, a plurality of nozzles 204, and an outer ring 206. The plurality of nozzles 204 extend from the base 202 to the outer ring 206, and are spaced along a circumferential direction (not shown). As is discussed in greater detail below, the plurality of nozzles 204 may be positioned in a core air flowpath 37 of a gas turbine engine when installed in the gas turbine engine (see FIGS. 15 and 16).

The base 202 includes a seal 98 integrated therein. The seal 98 may be configured in the same manner as one or more of the exemplary seals 98 described above with reference to FIGS. 2 through 13, and therefore the same numbers may refer to the same part or component. For example, the seal 98 integrated into the base 202 includes a bearing 100 defining an inner surface 108. As is discussed in greater detail below, the seal 98 integrated into the base 202 of the nozzle stage 200 depicted may act as both a bearing 100 for the rotary component 214 as well as a seal 98 for the rotary component 214.

Referring now to FIG. 15, a schematic, side view of a compressor section of a gas turbine engine including one or more seals 98 in accordance with an exemplary embodiment of the present disclosure is provided. The exemplary compressor section depicted in FIG. 15 may be configured in substantially the same manner as the compressor section of the exemplary turbofan engine 12 described above with reference to FIG. 1. Accordingly, the same or similar numerals may refer to the same or similar part.

As shown, the compressor section generally includes a compressor having one or more compressor stages 208 and at least partially defining a core air flowpath 37. More particularly, for the embodiment depicted, the compressor is a low pressure (LP) compressor 22 having three compressor stages 208. Each compressor stage 208 includes a plurality of compressor rotor blades 210 spaced along a circumferential direction C1 (i.e., a direction extending about an axial direction A1; not depicted) within the core air flowpath 37. Additionally, each of the compressor rotor blades 210 are attached to a respective compressor rotor 212 at an inner end along a radial direction R1.

The turbofan engine 12 additionally includes within the compressor section a rotary component 214 attached to and rotatable with a portion of the compressor section. The rotary component 214 attaches the various stages of compressor rotors 212 and drives/rotates the LP compressor 22 during operation. More specifically, the rotary component 214 includes a shaft, which for the embodiment depicted is configured as an LP shaft 36, and a plurality of compressor connectors 216 extending between and connecting the various compressor stages 208. Notably, the LP shaft 36 is also connected to a fan shaft 218 located within a fan section 14 of the turbofan engine 12 through a power gearbox 46. As with the LP compressor 22 described above, the LP compressor 22 depicted in FIG. 15 may progressively compress an airflow through a portion of the core air flowpath 37.

For the embodiment depicted, the rotary component 214 of the compressor section, including the LP shaft 36 and the compressor connectors 216, is supported by one or more seals 98 in accordance with an exemplary embodiment of the present disclosure. Specifically, the exemplary compressor section depicted includes a first seal 98A located inward of and separated from the core air flowpath 37 along the radial direction R1. The first seal 98A is rigidly attached to a static component 215 of the compressor section and directly supports the rotary component 214, or more particular, the LP shaft 36. Notably, the compressor section defines a first (low pressure) air cavity 234 and a second (high pressure) air cavity 236. The second air cavity 236 may define a higher pressure than the first air cavity 234. Accordingly, a portion of the bearing 100 of the first seal 98 exposed to the second air cavity 236 may be a high pressure end 109 of the bearing 100 and a portion of the bearing 100 of the first seal 98 exposed to the first air cavity 234 may be a low pressure end 110 of the bearing 100. For example, in certain embodiments, the second air cavity 236 may be configured to provide a flow of pressurized cooling air to certain downstream locations of the gas turbine engine.

Referring still to FIG. 15, the exemplary compressor section depicted additionally includes one or more seals 98 in accordance with an exemplary embodiment of the present disclosure integrated into a nozzle stage 200. Specifically, the exemplary compressor section depicted includes two nozzle stages 200, each nozzle stage 200 located between two sequential compressor stages 208 of the LP compressor 22. Further, each of the two nozzle stages 200 supports the rotary component 214, or rather the compressor connectors 216 of the rotary component 214, connecting the two compressor stages 208 of the LP compressor 22 between which each respective nozzle stage 200 is located.

Each nozzle stage 200 depicted in FIG. 15 may be configured in a manner similar to the exemplary nozzle stage 200 described above with reference to FIG. 14. For example, each nozzle stage 200 depicted generally includes a base 202, a plurality of nozzles 204, and an outer ring 206. Additionally, the plurality of nozzles 204 are spaced along the circumferential direction C1 and extend from the base 202 to the outer ring 206, through the core air flowpath 37. With such a configuration, the plurality of nozzles 204 may also be referred to as compressor stator vanes.

Further, the base 202 includes a seal 98 having a bearing 100 incorporated therein (see also FIG. 14). For example, as discussed above the bearing 100 of the seal 98 included within the base 202 may have a plurality of bearing pads 106 defining an inner surface 108 for supporting the rotary component 214 (see also FIG. 14). During operation, the gas bearing 100 may provide a flow of working gas through the inner surface 108 to provide a low friction support for the rotary component 214. More particularly, the nozzle stage 200 may be configured such that the inner surface 108 is located in a tight clearance relationship with the rotary component 214, such that the airflow provided through the inner surface 108 creates a thin fluid film between the inner surface 108 and the rotary component 214.

Moreover, for each of the exemplary seals 98 depicted, working gas is provided through the inner surface 108 to support the rotary component 214 during operation. With such a configuration, an airflow is prevented from flowing from the high pressure end 109 of the seal 98 to the low pressure end 110 of the seal 98 between the rotary component 214 and the inner surface 108 of the bearing 100.

Referring specifically to the seals 98 incorporated in the nozzle stages 200, an airflow from the core air flowpath 37 is prevented from flowing from the high pressure end 109 of the seal 98 to the low pressure end 110 of the seal 98 between the rotary component 214 and the inner surface 108 of the gas bearing 100. More particularly, as should be appreciated, within the compressor section an airflow at a downstream location generally defines a higher pressure than an airflow at an upstream location. Accordingly, the downstream air may try to flow upstream around the seal 98 of the nozzle stage 200 (i.e., between the seal 98 and the rotary component 214), from each high pressure end 109 to respective low pressure end 110. Such a flow may decrease an efficiency of the LP compressor 22. However, given that seals 98 integrated in the nozzle stages 200 are configured such that the inner surfaces 108 of each of the gas bearings 100 are located in a tight clearance relationship with the rotary component 214, and further given that a flow of working gas is provided through the inner surfaces 108 of the gas bearings 100 during operation (the flow of working gas forced outward from between the inner surface 108 of the gas bearing 100 and the rotary component 214), an airflow in the core air flowpath 37 is prevented from flowing from each high pressure end 109 to respective the low pressure end 110 between the rotary component 214 and the inner surface 108 of the bearing 100.

Referring now to FIG. 16, a schematic, side view of a turbine section of a gas turbine engine including one or more nozzle stages 200 in accordance with an exemplary embodiment of the present disclosure is provided. The exemplary turbine section depicted in FIG. 16 may be configured in substantially the same manner as the turbine section of the exemplary turbofan engine 12 described above with reference to FIG. 1. Accordingly, the same or similar numerals may refer to the same or similar part.

Similar to the exemplary compressor section described above with reference to FIG. 15, the exemplary turbine section depicted generally includes a turbine having one or more turbine stages 220. The turbine section at least partially defines a core air flowpath 37, and further defines an axial direction A1, a radial direction R1, and a circumferential direction C1 (i.e., a direction extending about the axial direction A1; not depicted). More particularly, for the embodiment depicted, the turbine is a low pressure (LP) turbine 30 having at least seven turbine stages 220. However, in other embodiments, the LP turbine 30 may have any other suitable number of turbine stages 220. Each turbine stage 220 includes a plurality of turbine rotor blades 222 spaced along the circumferential direction C1 in the core air flowpath 37. Additionally, each of the turbine rotor blades 222 are attached to a respective turbine rotor 224. The gas turbine engine further includes within the turbine section a rotary component 214 attached to and rotatable with a portion of the turbine section. More particularly, the rotary component 214 attaches the various stages of turbine rotors 224 through turbine connectors 226 and imparts rotational energy extracted from an airflow through the LP turbine 30 to an output shaft, which for the embodiment depicted is configured as an LP shaft 36. In certain embodiments, the LP shaft 36 may connect the LP turbine 30 to, e.g., the LP compressor 22 described above with reference to FIG. 15.

Further, as with the exemplary compressor section described above with reference to FIG. 15, for the exemplary LP turbine 30 depicted, the rotary component 214, including the LP shaft 36 and the turbine connectors 226, is supported by one or more seals 98 in accordance with an exemplary embodiment of the present disclosure. Specifically, the exemplary turbine section depicted includes three seals 98, each seal 98 integrated into a respective nozzle stage 200. The exemplary nozzle stages 200 depicted are each located between two sequential turbine stages 220 of the LP turbine 30.

Notably, the exemplary turbine section depicted additionally includes a plurality of stages 228 of turbine stator vanes 230 positioned between the sequential turbine stages 220 not including a turbine nozzle stage 200. The rotary component 214 and each stage 228 of turbine stator vanes 230 together include a plurality of seals 98 232 for preventing air at a relatively high pressure from flowing downstream around a radially inner end of the stator vanes 230 to a lower pressure location in the core air flowpath 37.

Referring still to FIG. 16, each nozzle stage 200 depicted having an exemplary seal 98 integrated therein may also be configured in a manner similar to the exemplary nozzle stage 200 described above with reference to FIG. 14. Accordingly, each nozzle stage 200 depicted may also be configured for supporting the rotary component 214 and preventing an airflow from a high pressure end 109 of a bearing 100 of the seal 98 to a low pressure end 110 of the bearing 100 of the seal 98, between the rotary component 214 and an inner surface 108 of the bearing 100 of the seal 98 (see also FIG. 14). With such a configuration, the exemplary nozzle stages 200 depicted in FIG. 16 may act as both a bearing 100 for supporting the rotary component 214 and a seal 98 between the nozzle stage 200 and the rotary component 214.

In certain exemplary embodiments, a gas turbine engine may include a compressor section similar to the exemplary compressor section depicted in FIG. 15 and a turbine section similar to the exemplary turbine section depicted in FIG. 16. Accordingly, with such an embodiment, a rotary component 214 may be supported by a plurality of nozzle stages 200 located within the compressor section and a plurality of nozzle stages 200 located within the turbine section. For example, an LP shaft 36 drivingly connecting an LP turbine 30 to an LP compressor 22 may be supported by one or more nozzle stages 200 within the LP compressor 22 and one or more nozzle stages 200 within the LP turbine 30. The rotary component 214 may be fully supported in such a manner.

It should be appreciated, however, that in other embodiments, the gas turbine engine may be configured in any other suitable manner. For example, in other embodiments, one or more oil-lubricated bearings 100 may be used in addition to the one or more nozzle stages 200 described herein. Additionally, or alternatively, the gas turbine engine may include one or more gas bearings 100 not integrated into a nozzle stage 200 for further supporting rotary components 214 of the gas turbine engine. Further, in still other embodiments, the compressor section and/or turbine section may include any suitable number of nozzle stages 200, and is not limited to the number of nozzle stages 200 incorporated in the exemplary compressor and turbine sections described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine defining an axial direction and a radial direction, the turbomachine comprising:
   a compressor section and a turbine section;
   a rotary component attached to and rotatable with a portion of at least one of the compressor section and the turbine section; and
   a seal comprising a gas bearing, the gas bearing defining an inner surface along the radial direction, a higher pressure end of the gas bearing, and a lower pressure end of the gas bearing, the gas bearing supporting the rotary component exposing the higher pressure end of the gas bearing to a higher pressure and exposing the lower pressure end of the gas bearing to a lower pressure, each with respect to the other, and the gas bearing preventing an airflow from the higher pressure end of the gas bearing to the lower pressure end of the gas bearing between the rotary component and the inner surface of the gas bearing;
   wherein the gas bearing comprises a bearing pad defining the inner surface and one or more support members for supporting the bearing pad, wherein the one or more support members are asymmetrically configured along the axial direction such that the seal comprises a greater level of support by the one or more support members at the higher pressure end than at the lower pressure end preventing pressure differential induced bearing pad tilt;
   wherein the one or more support members comprise a semi-rigid portion joined to a rigid portion, each with respect to the other.

2. The turbomachine of claim 1, wherein the higher pressure end is defined at a first end of the bearing along the axial direction, and wherein the lower pressure end is defined at a second end of the bearing along the axial direction.

3. The turbomachine of claim 1, wherein the one or more support members are configured for supporting the bearing pad, wherein the bearing pad defines a center along the axial direction, and wherein the one or more support members are located off-center along the axial direction.

4. The turbomachine of claim 1, wherein the bearing pad defines a plurality of air distribution holes, and wherein the plurality of air distribution holes are asymmetrically configured along the axial direction to provide a greater amount of working gas at a lower pressure half of the inner surface as compared to an amount of working gas provided at a higher pressure half of the inner surface.

5. The turbomachine of claim 1, wherein the seal defines a gas inlet for providing a working gas to the bearing, and wherein the working gas is provided to the bearing at a pressure that is greater than a pressure outside the seal at the lower pressure end of the bearing and is also greater than a pressure outside the seal at the higher pressure end of the bearing.

6. The turbomachine of claim 1, wherein the compressor section and the turbine section define in part a core air flowpath, wherein the seal is located inward of and is separated from the core air flowpath along the radial direction.

7. The turbomachine of claim 6, wherein the turbomachine defines a high pressure cavity and a low pressure cavity, wherein the higher pressure end of the bearing is exposed to the high pressure cavity, and wherein the lower pressure end of the bearing is exposed to the low pressure cavity.

8. The turbomachine of claim 1, wherein the compressor section and the turbine section define in part a core air flowpath, wherein the seal is configured as a base of a nozzle stage of the turbomachine, the nozzle stage further comprising a plurality of nozzles extending from the base into the core air flowpath and spaced along a circumferential direction of the turbomachine, and wherein the higher pressure end of the bearing and the lower pressure end of the bearing are each exposed to the core air flowpath.

9. The turbomachine of claim 8, wherein the compressor section comprises a compressor comprising one or more compressor stages, and wherein the nozzle stage is located adjacent to the one or more compressor stages.

10. The turbomachine of claim 8, wherein the turbine section comprises a turbine comprising one or more turbines stages, and wherein the nozzle stage is located adjacent to the one or more turbines stages.

11. The turbomachine of claim 1, wherein the bearing pad comprises a plurality of bearing pads defining an inner surface, and wherein the plurality of bearing pads each provide a flow of working gas through the inner surface to provide a low friction support for the rotary component.

12. The turbomachine of claim 1, wherein the semi-rigid portion comprises one or more springs.

13. The turbomachine of claim 1, wherein the one or more support members comprises a plurality of support members.

14. A seal for a turbomachine defining an axial direction and a radial direction and comprising a compressor section, a turbine section, and a rotary component attached to and rotatable with a portion of at least one of the compressor section and the turbine section, the seal comprising:
   a gas bearing defining an inner surface along the radial direction, a higher pressure end of the gas bearing, and a lower pressure end of the gas bearing, the gas bearing supporting the rotary component exposing the higher pressure end of the gas bearing to a higher pressure and exposing the lower pressure end of the gas bearing to a lower pressure, each with respect to the other, and the gas bearing preventing an airflow from the higher pressure end of the gas bearing to the lower pressure end of the gas bearing between the rotary component and the inner surface of the gas bearing;
   wherein the gas bearing comprises a bearing pad and a plurality of support members for supporting the bearing pad, wherein the plurality of support members are asymmetrically configured along the axial direction such that the seal comprises a greater level of support by the pluraltiy of support members at the higher pressure end than at the lower pressure end preventing pressure differential induced bearing pad tilt;
   wherein the plurality of support members comprise a semi-rigid portion joined to a rigid portion, each with respect to the other.

15. The seal of claim 14, wherein the higher pressure end is defined at a first end of the seal along the axial direction, and wherein the lower pressure end is defined at a second end of the seal along the axial direction.

16. The seal of claim 14, wherein the plurality of support members are configured for supporting the bearing pad, wherein the bearing pad defines a center along the axial direction, and wherein the plurality of support members are located off-center along the axial direction.

17. The seal of claim 14, wherein the bearing pad defines a plurality of air distribution holes, and wherein the plurality of air distribution holes are asymmetrically configured along the axial direction to provide a greater amount of working gas at a lower pressure half of the inner surface as compared to an amount of working gas provided at a higher pressure half of the inner surface.

18. The seal of claim 14, wherein the compressor section and the turbine section define in part a core air flowpath, wherein the seal is configured as a base of a nozzle stage of the turbomachine, the nozzle stage further comprising a plurality of nozzles extending from the base into the core air flowpath and spaced along a circumferential direction of the turbomachine.

* * * * *